(12) United States Patent
Mimura et al.

(10) Patent No.: US 7,190,850 B2
(45) Date of Patent: Mar. 13, 2007

(54) PMD EMULATOR

(75) Inventors: Yu Mimura, Tokyo (JP); Kazuhiro Ikeda, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/087,532

(22) Filed: Mar. 24, 2005

(65) Prior Publication Data
US 2005/0244092 A1    Nov. 3, 2005

Related U.S. Application Data

(63) Continuation of application No. PCT/JP03/12150, filed on Sep. 24, 2003.

(30) Foreign Application Priority Data

Sep. 24, 2002 (JP) ............................. 2002-277982

(51) Int. Cl.
*G02B 6/126* (2006.01)
*H04B 10/00* (2006.01)
*G02B 6/00* (2006.01)

(52) U.S. Cl. ............................. 385/11; 385/31; 398/152

(58) Field of Classification Search ...................... None
See application file for complete search history.

(56) References Cited

U.S. PATENT DOCUMENTS

| | | | | |
|---|---|---|---|---|
| 6,654,103 B2 * | 11/2003 | Yu et al. | ..................... | 356/73.1 |
| 6,847,484 B2 * | 1/2005 | Damask et al. | ............. | 359/497 |
| 6,934,083 B2 * | 8/2005 | Damask | ....................... | 359/497 |
| 2002/0075477 A1 * | 6/2002 | Yu et al. | ..................... | 356/73.1 |
| 2002/0080467 A1 * | 6/2002 | Damask | ....................... | 359/301 |
| 2002/0118455 A1 * | 8/2002 | Damask | ....................... | 359/484 |
| 2004/0263973 A1 * | 12/2004 | Damask | ....................... | 359/484 |
| 2005/0129346 A1 * | 6/2005 | Chen et al. | ................... | 385/11 |

FOREIGN PATENT DOCUMENTS

WO    WO 99/53363 A2    10/1999

OTHER PUBLICATIONS

Hauer et al. "Compact all-fiber PMD emulator using an integrated series thin-film micro-heaters", Optical Fiber Communications Conference and Exhibit, 2002, OFC. 2002, Mar. 2002, pp. 374-375.*

J.H. Lee and Y.C. Chung, Statistical PMD Emulator using Variable DGD Elements, Oprical Communication Conference and Exhibit, 2002, OFC 2002, Mar. 2002, pp. 375-376.

* cited by examiner

*Primary Examiner*—Sung Pak
(74) *Attorney, Agent, or Firm*—Oblon, Spivak, McClelland, Maier & Neustadt, P.C.

(57) ABSTRACT

A PMD emulator configured by connecting in this order: an input-side optical fiber 71 for receiving light to be measured; a first polarization rotating portion 73 including M DGD sections 76 (M is an integer equal to or more than 2) concatenated by (M−1) polarization rotators 80, one DGD section being arranged at each end of said first polarization rotating portion; an arbitrary-arbitrary polarization controller 75 for changing any state of polarization into any other state of polarization, a second PMD rotating portion 74 configured in the same way as the first polarization rotating portion 73 an output-side optical fiber for outputting the light to be measured.

9 Claims, 24 Drawing Sheets

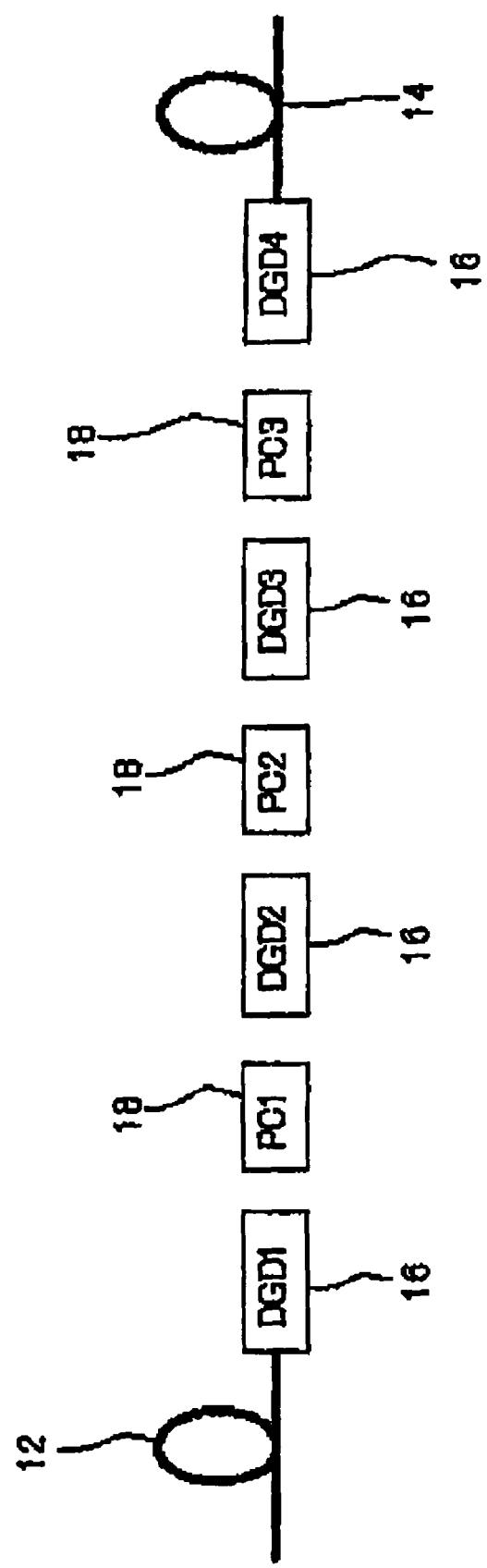

PMD EMULATOR

CROSS REFERENCE TO RELATED APPLICATION

This is a Continuation application of PCT Application No. PCT/JP03/12150, filed Sep. 24, 2003, which was not published under PCT Article 2 1(2) in English. This application is based upon and claims the benefit of priority from the prior Japanese Patent Application No. 2002-277982, filed Sep. 24, 2002, the entire contents of which are incorporated herein by reference.

FIELD OF THE INVENTION

The present invention relates to a PMD (Polarization Mode Dispersion) emulator for estimating PMD which occurs when signal light propagates or for compensating optical transmission path.

BACKGROUND OF THE INVENTION

As an optical transmission system has been advanced and become popular in recent years, multi channeling based on the WDM (Wavelength Division Multiplexing) system is being developed to increase transmission capacity of the system.

Beside this multi channeling system, in order to increase transmission capacity, there is a way of increasing a bit rate of optical pulses on each channel. 10 Gb/s has been now installed and recently 40 Gb/s is expected to be installed for the next generation.

In such a high-bit-rate optical transmission path, there are some factors for deterioration of transmission quality.

One of them is PMD (Polarization Mode Dispersion). This is a phenomenon such that in transmitted optical pulses, orthogonal polarization modes which should in theory be degenerating are separated to increase pulse width due to birefringence that occurs randomly in an optical fiber of optical pulse transmission path. Optical pulses with such a phenomenon can not serve as a right optical signal.

Accordingly, a study has been made to reduce this PMD in a recent optical fiber. However, this is at most 0.25 $ps/km^{1/2}$. If such an optical fiber is used at the bit rate of 40 Gb/s, the distance which allows optical transmission is about 100 km at most, and optical transmission can not be realized at the distance more than 100 km.

In addition, PMD of an optical fiber installed in previous years is around 1 $ps/km^{1/2}$ and therefore, when the bit rate is 10 Gb/s, possible transmission distance is about 170 km while when the bit rate is 40 Gb/s, possible transmission distance is decreased to be only 10 km.

Thus, in an optical transmission system with use of a previously installed optical fiber, if the bit rate is increased to be 10 Gb/s or if a new optical fiber is installed for the next generation and used at more than 40 Gb/s, PMD affects optical transmission significantly, which results in difficulty to construct a high-bit-rate practical optical transmission system.

For this reason, a PMD emulator is used to estimate a PMD characteristic in an optical transmission system which performs transmission at a high bit rate, and to compensate PMD which occurs in the optical transmission system.

Here, in order to evaluate PMD and the like of the optical transmission system, a conventional PMD emulator used to emulate PMD characteristics of an actually used SMF (Single Mode Fiber) is described. If PMD is estimated with use of an actual SMF in an experimental laboratory, as the experimental laboratory is an environment more stable than the place where the SMF is actually installed, more time will be required. Accordingly, it is effective to use a PMD emulator to perform PMD estimation.

An SMF used in this example is tens through hundreds of kilometer long and PMD is zero through tens ps approximately and two or more PMD are included. In this emulator, first-order PMD (DGD: Differential Group Delay) and second-order PMD (SOPMD) are handled.

A schematic view of the PMD emulator of this example is shown in FIG. 18. This PMD emulator is modeled by coupling plural (for example 100) DGD sections $161_1$ through $161_n$. In this example, a birefringent portion is used in a DGD section. The more DGD sections are used, the closer they are to the actual SMF characteristic. Therefore, in order to obtain PMD characteristic close to that occurring in an actual SMF, an extremely large-scale and expensive PMD emulator is required.

In order to obtain PMD characteristics of an SMF, DGD sections $161_1$ through $161_n$ are rotated. The rotation speed is different between DGD sections however, each rotation speed is fixed and the speed is not controlled.

FIG. 19 is a graph showing DGD and SOPMD characteristics obtained by this PMS emulator. The horizontal axis of the graph indicates a wavelength (nm) and the vertical axis indicates DGD (ps) and SOPMD ($ps^2$). FIG. 20A shows DGD distribution and FIG. 20B shows SOPMD distribution. Correlation between DGD and SOPMD at each wavelength is proved to be positive as shown in FIG. 21.

However, in order to obtain this PMD characteristic, a large-scale PMD emulator made up of a large number of DGD sections is used to be in operation for a long time.

Next, a typical example of PMD emulator in U.S. patent publication NO. 2002/080467 is descried specifically (see U.S. 2002/0080467, for example). FIG. 17 shows a schematic configuration of this device. Light to be measured is input into this device and then an accurate PMD can be obtained.

This PMD emulator 100 includes an input-side optical fiber 101 and an output-side optical fiber 102, birefringent portions 104, 106 and 108 which are composed of DGD portions 122, 132 and 142 and phase shift portions 124, 134 and 144, respectively and polarization mode mixing portions 110, 112 and 114. The birefringent portions 104, 106 and 108 and polarization mode mixing portions 110, 112 and 114 are connected by turn to make up plural stages (one birefringent portion and one polarization mode mixing portion consist in one stage). In FIG. 17, N stages made up of N birefringent portions and N polarization mode mixing portions are shown. The phase shift portions 124, 134 and 144 are provided with controllers 126, 136 and 146 for controlling a phase shift amount while the polarization mode mixing portions are provided with controllers 116, 118 and 120 for controlling polarization rotational direction.

Another conventional example is described below.

PMD generated in a transmission path installed previously is distributed in the temporal direction and in the frequency direction. These distributions are in accordance with theoretically shown probability density distribution, DGD (first-order PMD) is given a Maxwell's distribution and SOPMD (second-order PMD) is given a corresponding probability density function (see OPTICAL FIBER TELE-COMMUNICATIONS, VOLUME IVB, Chapter 5 "Polarization-Mode Dispersion"). When transmission performance is tested, the distribution in the temporal direction is impotent, and used as a PMD emulator for simulating PMD on such an actual transmission path is a PMD emulator configured of multi-stage DGD sections of polarization maintaining fiber or a birefringent crystal, a variable polarization rotator being arranged between every two of the DGD sections and rotates them at randomly set rotation angle (see Proc.PFC02, paper ThA3, pp 374–375, 2002).

In the conventional PMD emulator disclosed in the U.S. publication No. 2002/0080467, used as a polarization mode mixing portion is YVO4 or LiNbO3. Since they utilize electro-optic effect, a large-scale device such as a piezoelectric element is required, which presents a problem of large power consumption. YVO4 and LiNbO3 also present a problem of large insertion loss.

Further in the conventional PMD emulator, in order to make the PMD temporal direction sufficiently close to theoretical probability density function, it is necessary to increase stages of DGD sections. Since in such a device, a large number of controlling portions are needed in accordance with the number of DGD sections, there occurs a problem that the device is complicated and expensive. In order to evaluate the optical system, it is necessary to obtain PMD characteristics by operating the device of many components for a long time.

Furthermore, in the conventional PMD emulator, in order to obtain statistic PMD characteristics (distribution), it is necessary to operate the PMD emulator for a long time until all data PMD values are obtained, and it is impossible to obtain only desired PMD values at some time.

Furthermore, there is a problem that in order to change an average DGD value, it is necessary to change DGD itself of each DGD section.

Furthermore, in the conventional PMD emulator, it is impossible to obtain PMD characteristic by fixing angle and not by changing connection angle.

Accordingly, the present invention was carried out in view of the problems of the related arts. An object of the present invention is to provide a PMD emulator which operates stably at low power consumption, which is low in insertion loss, which is configured of less components, which does not need a complex and expensive device, which generate a desired DGD value at some time, which allows an average DGD to be changed without changing DGD values of respective sections and which can obtain PMD characteristics without changing a connection angle.

SUMMARY OF THE INVENTION

In order to solve the above-mentioned problems, a first embodiment of a PMD emulator of the present invention is a PMD emulator comprising:

an input-side optical fiber for receiving light to be measured;

an output-side optical fiber for outputting the light to be measured;

a first polarization rotating portion including M DGD sections (M is an integer equal to or more than 2) concatenated by (M−1) polarization rotators, one DGD section being arranged at each end of said first polarization rotating portion;

a second polarization rotating portion including N DGD sections (N is an integer equal to or more than 2) concatenated by (N−1) polarization rotators, one DGD section being arranged at each end of said second polarization rotating portion; and an arbitrary-arbitrary polarization controller for changing any state of polarization into any other state of polarization;

wherein said input-side optical fiber is connected to a DGD section at an input side of said first polarization rotating portion, a DGD section at an output side of said first polarization rotating portion being connected to a connecting portion at an input side of said arbitrary-arbitrary polarization controller, a connecting portion at an output side of said arbitrary-arbitrary polarization controller being connected to a DGD section at an input side of said second rotating portion, and a DGD section at an output side of said second polarization rotating portion being connected to said output-side optical fiber.

Another embodiment of a PMD emulator of the present invention is a PMD emulator in which said polarization controller has a polarization shifter connected between polarization rotators.

Another embodiment of a PMD emulator of the present invention is a PMD emulator in which M is 2 and N is 2.

Another embodiment of a PMD emulator of the present invention is a PMD emulator in which said polarization rotators are controlled based on a control parameter obtained by a simulation thereby to generate a desired PMD value.

Another embodiment of a PMD emulator of the present invention is a PMD emulator in which said polarization rotators are controlled to change an average DGD without changing DGD characteristics of the DGD sections.

Another embodiment of a PMD emulator of the present invention is a PMD emulator including 40 or more DGD sections connected with a random relative angle and a temperature controlling mechanism for changing a temperature as a whole.

Another embodiment of a PMD emulator of the present invention is a PMD emulator in which the DGD sections have difference DGD in accordance with normal distribution.

Another embodiment of a PMD emulator of the present invention is a PMD emulator in which standard deviation of the normal distribution is 20% of an average of the normal distribution.

Another embodiment of a PMD emulator of the present invention is a PMD emulator in which the DGD sections are polarization maintaining fibers or uniaxial birefringent crystals.

BRIEF DESCRIPTION OF THE DRAWINGS

FIG. 5 is a view illustrating another configuration of a PMD emulator according to the present invention;

DETAILED DESCRIPTION OF THE INVENTION.

Embodiments of the present invention will be described below with reference to the drawings.

First description is made about the principle of a PMD (Polarization Mode Dispersion) emulator. PMD of a PMD emulator consisting of a plurality of polarization maintaining fibers (PMFs) or a plurality of polarization rotators and a plurality of birefringent crystals can be calculated recursively. The first-order PMD vector output by the (n+1)th DGD section, $\tau(n+1)$, and the second-order PMD vector, $\tau\omega(n+1)$, are represented by connection relational equations as shown below:

(Equation 1)

$$\vec{\tau}(n+1) = R_{n+1}(\vec{\tau}(n) + \vec{\tau}_{n+1}) \tag{1}$$

(Equation 2)

$$\vec{\tau}_\omega(n+1) = R_{n+1}(\vec{\tau}_\omega(n) + \vec{\tau}_{n+1} \times \vec{\tau}(n)) \tag{2}$$

where: $\tau_{n+1}$ is the first-order PMD vector output by the (n+1)th DGD section, $\tau(n)$ is the first-order PMD vector output by first n DGD sections, and $R_n$ is rotation matrix for the n-th rotation polarizer.

Specifically, the amount of PMD (DGD and SOPMD) generated by two DGD sections may be represented as:

(Equation 3)

$$\tau = \sqrt{\tau_1^2 + \tau_2^2 + 2\tau_1\tau_2\cos 2\theta} \tag{3}$$

(Equation 4)

$$\tau_\omega = \tau_1\tau_2 \sin 2\theta \tag{4}$$

where $\tau_1$ and $\tau_2$ are the DGD of the two DGD sections and $\theta$ is the rotation angle. The DGD and the SOPMD are independent of frequency. The subfix denotes differentiation. Here, $\tau$ is the DGD, $\alpha$ is angular frequency of the carrier wave. In this case, since the SOPMD is always perpendicular to the first-order PMD vector, SOPMD has only the PSD component.

In contract, the DGD and SOPMD generated by the concatenation of more than two DGD sections have a periodic characteristic with respect to frequency, and the SOPMD has two components. The free spectrum range (FSR) of a device is determined by the length of each DGD section. When more than tree DGD sections are used, a plurality of FSRs are mixed, however, if the plurality of FSRs are equal, a single FSR can be generated for whole the emulator, and stable emulator characteristic can be achieved. In addition, if FSRs are shifted by the same amount, the characteristics can be shifted while keeping the characteristic profile.

Next description if made about embodiments of a PMD emulator according to the present invention based on this principle.

Figure 1A:
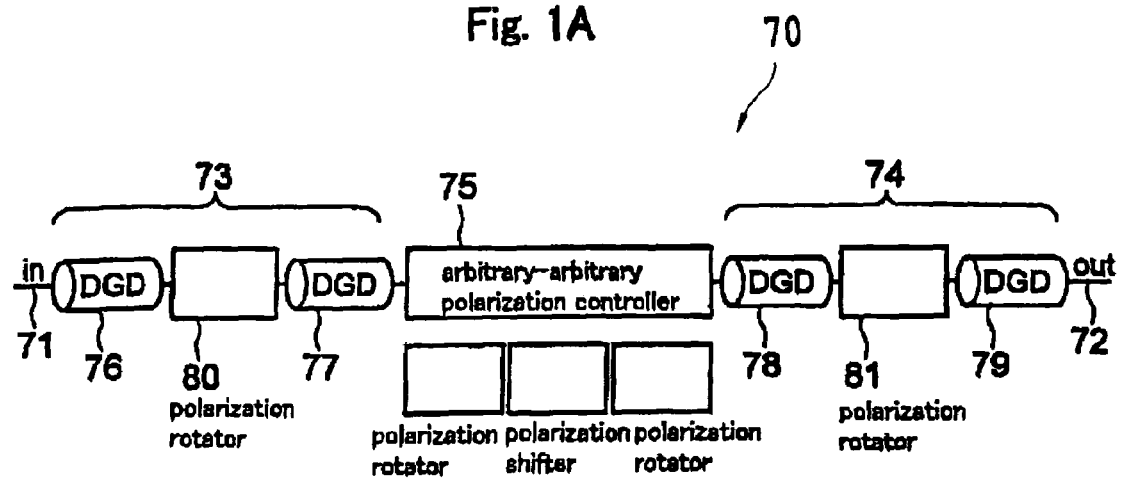
FIGS. 1A and 1B are views each illustrating a configuration of a PMD emulator according to the present invention.
Figure 1B:
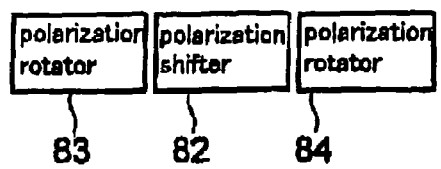

FIGS. 1A and 1B show an embodiment of a PMD emulator including a polarization controller according to the present invention. The PMD emulator 70 of this embodiment includes a first polarization rotating unit 73 which has DGD sections 76 and 77 (M=2) and a second polarization rotating unit 74 which has DGD sections 78 and 79 (N=2), and totally the PMD emulator 70 includes four DGD sections.

As shown in FIG. 1A, the first polarization rotating unit 73 is configured by connecting the DGD section 76 to a polarization rotator 80, and connecting the polarization rotator 80 to the DGD section 77. Likewise, the second polarization rotating unit 74 is configured by connecting the DGD section 78 to a polarization rotator 81, and connecting the polarization rotator 81 to the DGD section 79.

An input-side optical fiber 71 which receives light to be measured is connected to the DGD section 76 which is located at the input side of the first polarization rotating unit 73. The DGD section 77 at the output side of the first polarization rotating unit 73 is connected to a connecting portion at the input side of an arbitrary-arbitrary polarization controller 75. A connecting portion at the output side of the arbitrary-arbitrary polarization controller 75 is connected to the DGD section 78 at the input side of the second polarization rotating unit 74. The DGD section 79 at the output side of the second polarization rotating unit 74 is connected to the output-side optical fiber 72 which outputs light to be measured.

The DGD sections 76 through 79 are made of PMFs (Polarization Maintaining Fibers). However, they may be made of birefringent crystals such as TiO2 instead of PMF.

The polarization rotators 80 and 81 may be realized by Faraday rotators or by rotating a ½ waveplate.

FIG. 1B shows an arbitrary-arbitrary polarization controller 75 of the present embodiment. The arbitrary-arbitrary polarization controller 75 has the most common configuration such that a polarization rotator 83 and a polarization rotator 84 are connected to a polarization shifter 82 interposed therebetween.

This configuration can be realized by a smaller number of components than another configuration and therefore can provide an inexpensive device.

The polarization rotators 83 and 84 configured of the arbitrary-arbitrary polarization controller 75 may be realized by Faraday rotators or by rotating a ½ waveplate. The polarization shifter 82 may be realized by sandwiching a polarization rotator between two ¼ waveplates.

In this PMS emulator 70, light to be measured transmitted on the input-side optical fiber 71 is propagated along the DGD section 76, the polarization rotator 80, the DGD section 77, polarization rotator 83, the polarization shifter 82, the polarization rotator 84, the DGD section 78, the polarization rotator 81 and DGD section 79, in this order, and is transmitted to the outside from the output-side optical fiber 72.

Here, if the DGD section 76 and the DGD section 79 are made of crystals, collimators are arranged at ends of input-side optical fiber 71 and the output-side optical fiber 72.

This embodiment is described with the PMD emulator of which the number of DGD sections arranged in the first rotating unit is 2 (M=2) and the number of DGD sections arranged in the second rotating unit is 2 (N=2). M and N may be set at any numbers more than 2.

Next description is made about the procedure of obtaining PMD distribution by controlling accurately the PMD emulator 70 with four DGD section shown in FIG. 1A. As described above, in the conventional method, it was necessary to operate a PMD emulator with a concatenation of large number of DGD sections for a long time to obtain PMD distribution. In other words, the PMD characteristic could be obtained statistically after gathering all data and could not be obtained at a particular point of time.

However, with use of the above-described PMD emulator 70 it becomes possible to realize PMD values at a particular point of time by controlling rotation of each polarization rotator accurately.

Specifically, first, simulations are performed of a PMD emulator with a large number of DGD sections by computer calculation so as to obtain temporal change of DGD and SOPMD values (the PMD emulator is not activated in fact). Then, non-linear fitting is performed by the same computer calculation to calculate a control parameter of each polarization rotator of the PMD emulator 70 corresponding to desired DGD and SOPMD values. This calculated control parameter can be utilized to activate the PMD emulator 70 with four DGD section so as to generate desired DGD and SOPMD values.

The DGD and SOPMD values generated by the PMD emulator 70 can be measured by a polarization mode dispersion measuring unit.

Likewise, generation of various DGD and SOPMD values with use of a control parameter is repeated to make it possible to recapture temporal statistic distribution of SMF.

Further, although in the conventional PMD emulator, in order to change the average DGD it was necessary to change a DGD characteristic of each DGD section of the PMD emulator, in the PMD emulator 70 according to the present invention, the average DGD can be changed by accurately controlling polarization rotators.

Figure 2A:
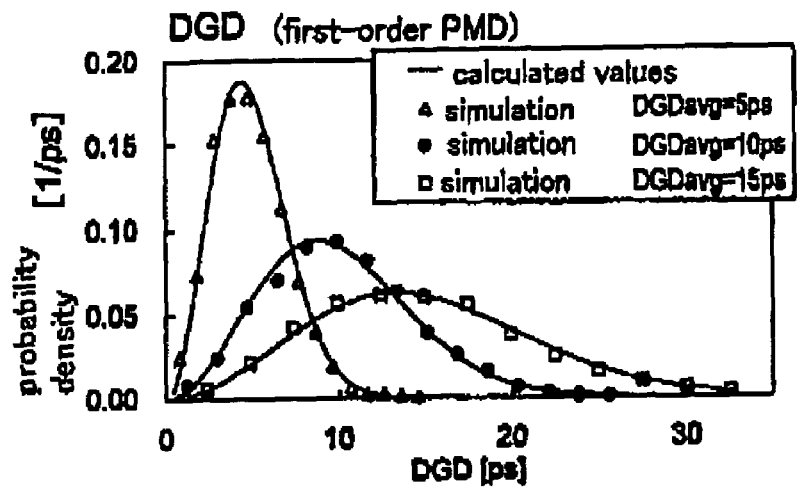
FIGS. 2A through 2C are graphs each for comparing PMD calculated values with measured values by a conventional PMD emulator consisting of 100 DGD sections.

FIG. 2A is a graph for comparing a DGD characteristic based on calculated values with measured values by a conventional PMD emulator consisting of 100 DGD sections. An average DGD of this PMD emulator is 10 ps.

Figure 2B:
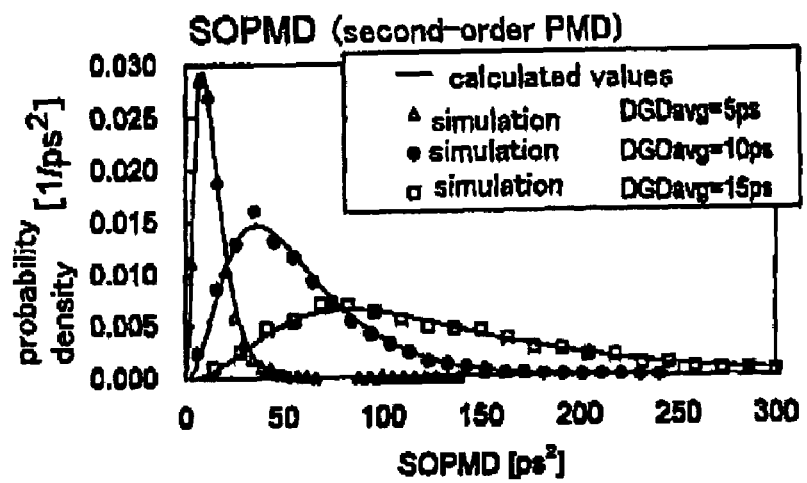

FIG. 2B is a graph for comparing a SOPMD characteristic based on calculated values with measured values by a conventional PMD emulator. As is seen from FIGS. 2A and 2B, for both of DGD and SOPMD, the calculated values almost agree with measured values.

Figure 2C:
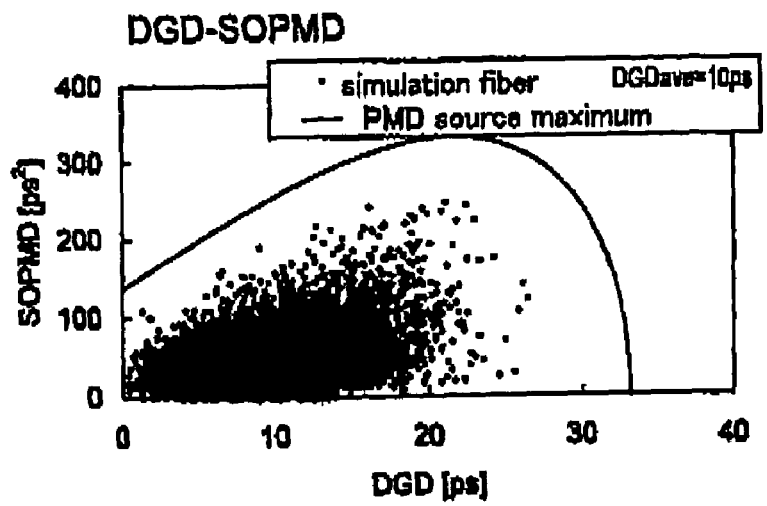

FIG. 2C is a graph for showing correlation between DGD measured values and SOPMD measured values, which shows they are in positive correlation.

Figure 3A:
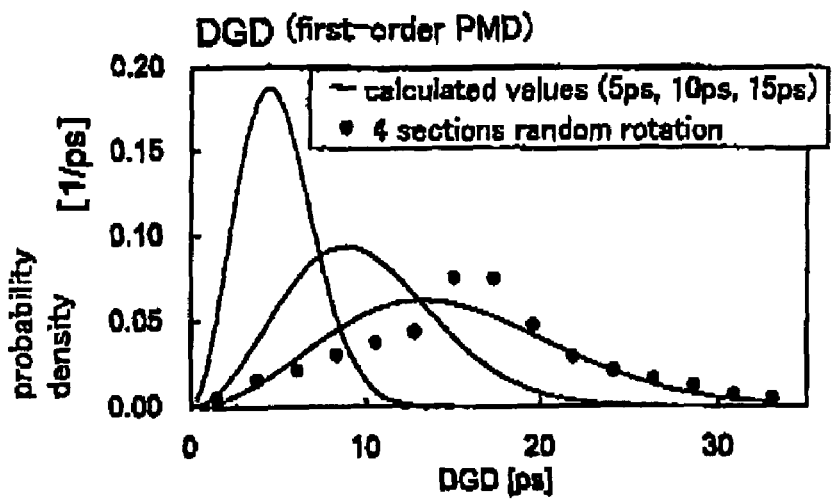
FIGS. 3A through 3C are graphs each for comparing PMD calculated values with measured values obtained after given rotation by a PMD emulator consisting of four DGD sections.

FIG. 3A is a graph comparing DGD calculated values with DGD measured values obtained after rotation at a given rotational speed (with no particular control) in a PMD emulator consisting of four DGD sections of 8 ps DGD according to the present invention.

Figure 3B:
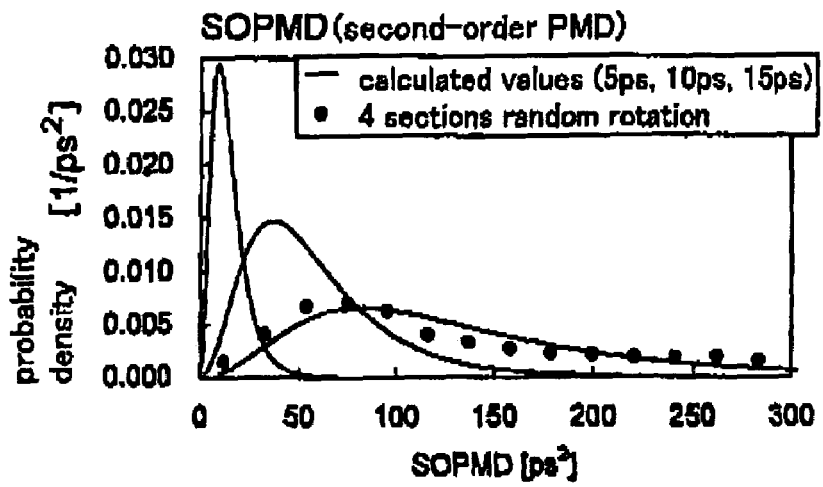

FIG. 3B is a graph comparing SOPMD calculated values with SOPMD measured values obtained after rotation at a given rotational speed in a PMD emulator 70 consisting of four DGD sections. As is seen from FIGS. 3A and 3B, for both of the DGD and SOPMD, the calculation and the measurement present different values.

Figure 3C:
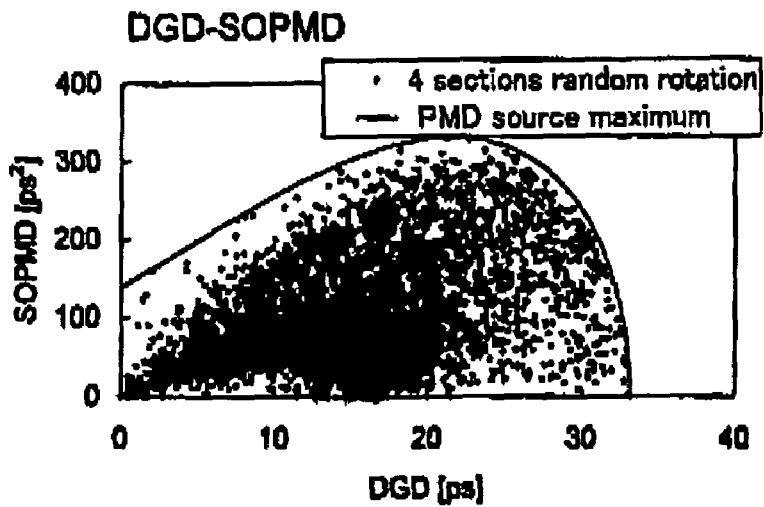

FIG. 3C is a graph for showing correlation between DGD measured values and SOPMD measured values. This graph shows that there is no correlation between them.

Figure 4A:
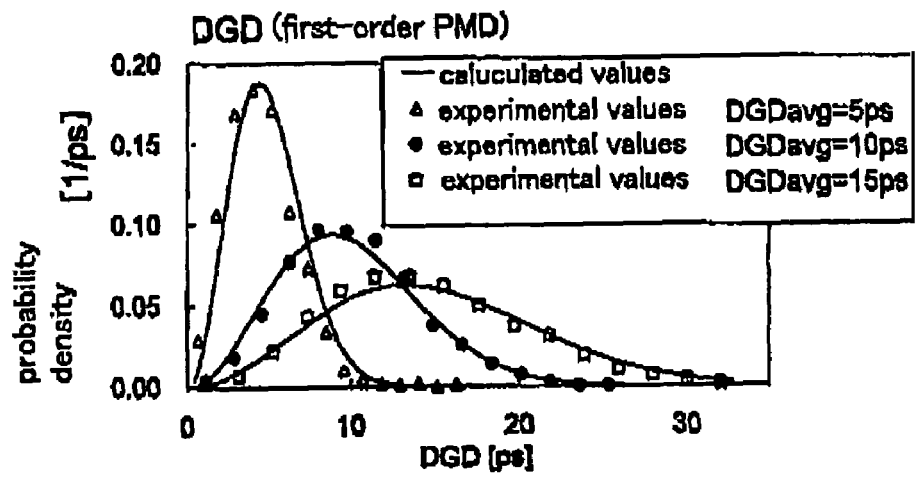
FIGS. 4A through 4C are graphs each for comparing DGD calculated values with measured values by a PMD emulator consisting of four DGD sections according to the present invention.

FIG. 4A is a graph for comparing calculated DGD characteristic with measured DGD values obtained when a polarization rotator is accurately controlled in a PMD emulator according to the present invention, the PMD emulator being configured by four DGD sections each with 8 ps DGD.

Figure 4B:
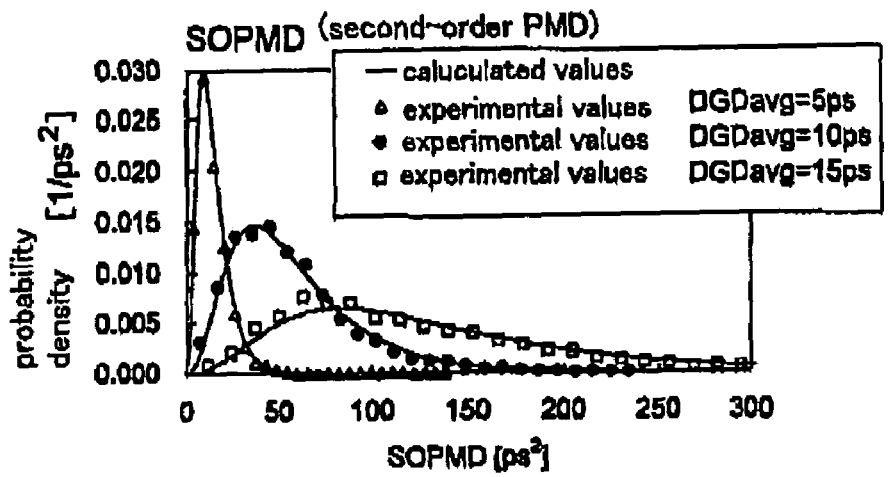

FIG. 4B is a graph for comparing calculated SOPMD characteristic with measured SOPMD characteristic obtained when a polarization rotator is accurately controlled in a PMD emulator with four DGD sections. For both of DGD and SOPMD, the calculated values and the measured values are almost identical.

Figure 4C:
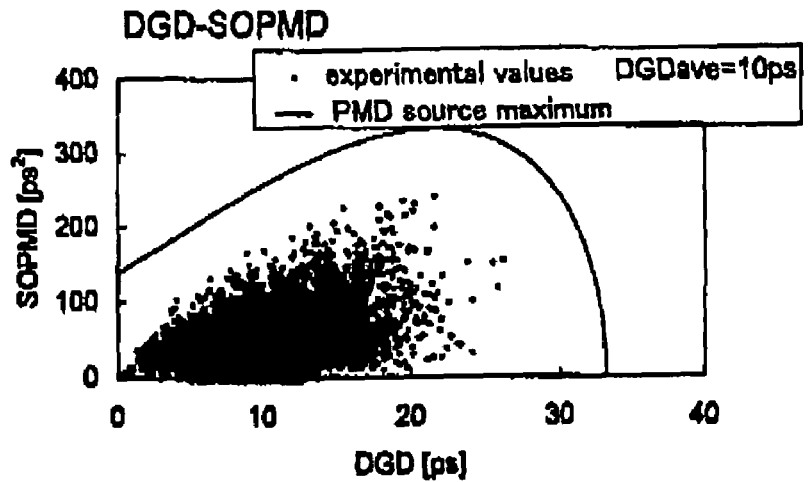

FIG. 4C is a graph for showing correlation between DGD measured values and the SOPMD measured values. This graph shows that they have positive correlation.

Description up to this point has been made about the PMD emulator having four DGD section and the arbitrary-arbitrary polarization controller with the polarization shifter between the two polarization rotators. However, the present invention is not limited to this embodiment. Other embodiments of a PMD emulator according to the present invention are given below.

FIG. 5 shows a configuration of another embodiment of the present invention. A PMD emulator 10 of this embodiment includes optical fibers 12 and 14 for inputting and outputting light to be measured, and four DGD sections 16 and three polarization controllers 18, and four DGD sections 16 and three polarization controllers 18 are connected by turns. A polarization controller 18 consists of a Faraday rotator and a DGD section 16 consists of a PMF (Polarization Maintaining Fiber). Here, the DGD section 16 may be made of a birefringent crystal such as TiO2 instead of PMF.

In this PMD emulator 10, light to be measured which propagates along an input-side optical fiber 12 is transmitted through a first DGD section 16, a first polarization controller, a second DGD section 16, a second polarization controller 18, a third DGD section 16 and a third polarization controller and a fourth DGD section 16 in this order, and the fourth DGD section 16 is coupled to an output-side optical fiber 14. If the first DGD section 16 and the fourth DGD section 16 are made of crystals, collimators (not shown) are arranged at ends of the optical fibers 12 and 14.

Further, in FIG. 5, the four DGD sections 16 and the three polarization controllers 18 are connected by turns, however, the numbers of DGD sections and polarization controllers are not limited to such a configuration. For example, five, six, . . . N DGD sections 16 may be arranged. Since a polarization controller is arranged between DGD sections 16, the number of polarization controllers to be arranged is one less than the number of DGD sections 16. In other words, if the number of DGD sections 16 is N, the number of polarization controllers 18 to be arranged will be (N−1).

In a polarization controller 18, a Faraday rotator is used to control polarization rotation of light output from a DGD section 6. With use of Faraday effect such that in the magnetic field, when light propagates in parallel to the magnetic field a polarization surface is rotated, the polarization controller 18 controls the angle of polarization surface of light in the reverse direction to traveling light. Since the Faraday rotator controls polarization rotation with a current of approximately 20 mA, it is characterized by low power consumption.

Figure 6:
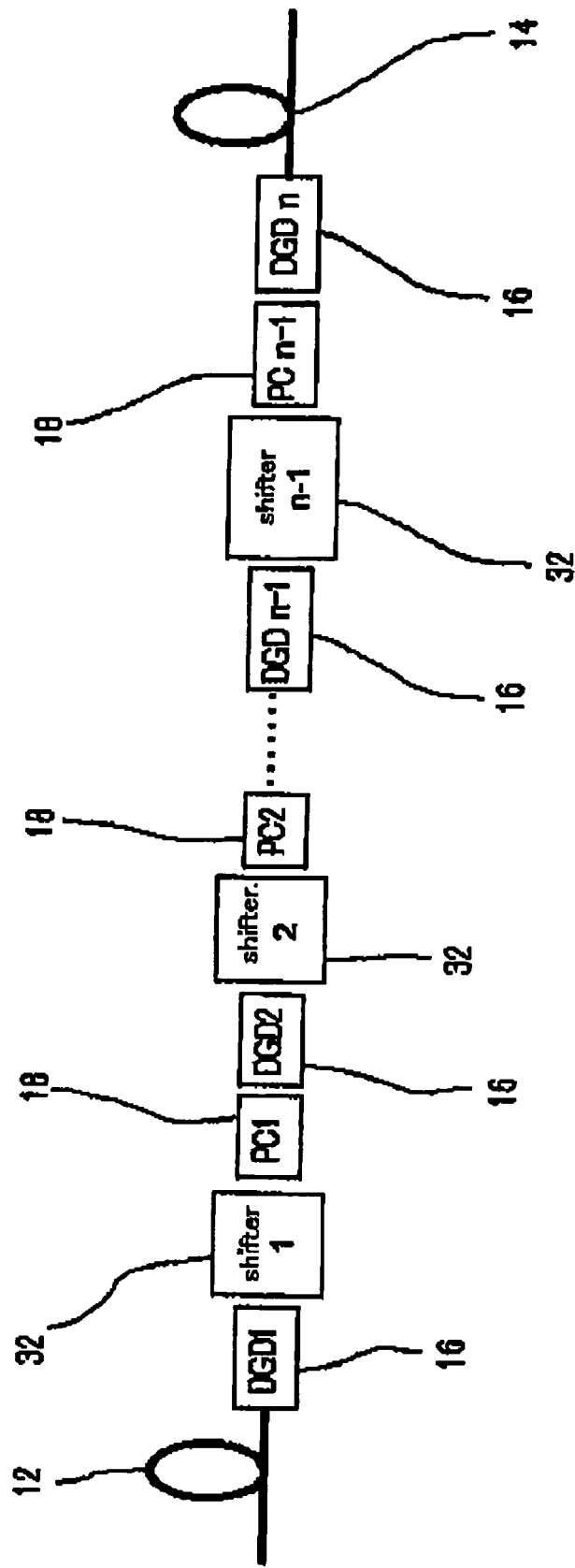
FIG. 6 is a view illustrating another configuration of the PMD emulator on FIG. 5.

Next, another embodiment of a PMD emulator is described with reference to FIG. 6. The PMD emulator 30 shown in FIG. 6 is configured differently from that in FIG. 5 in that a shifter 32 is arranged in the PMD emulator. By further description, in the PMD emulator 30 on FIG. 6, DGD sections 16 and polarization controllers 18 are configured and arranged in the same fashion, however, a shifter 32 is connected to each of the polarization controllers 18, which presents a difference in configuration between the PMD emulator of FIG. 6 from that of FIG. 5. Here, a shifter 32 is made of a Faraday rotator arranged between two ¼ waveplates.

As shown in FIG. 6, when N DGD sections 16 are arranged, (N−1) shifters 32 are arranged. With the configuration on FIG. 6, shifters 32 which are the same in number as the polarization controllers 18 will be arranged. Each of shifters 32 is arranged nearer to the input-side optical fiber 12 than the corresponding polarization controller 18 is.

Here, the number of shifters 32 may be set to (N−2) depending on arrangement. An example of such a configuration is described with reference to FIG. 7.

Figure 7:
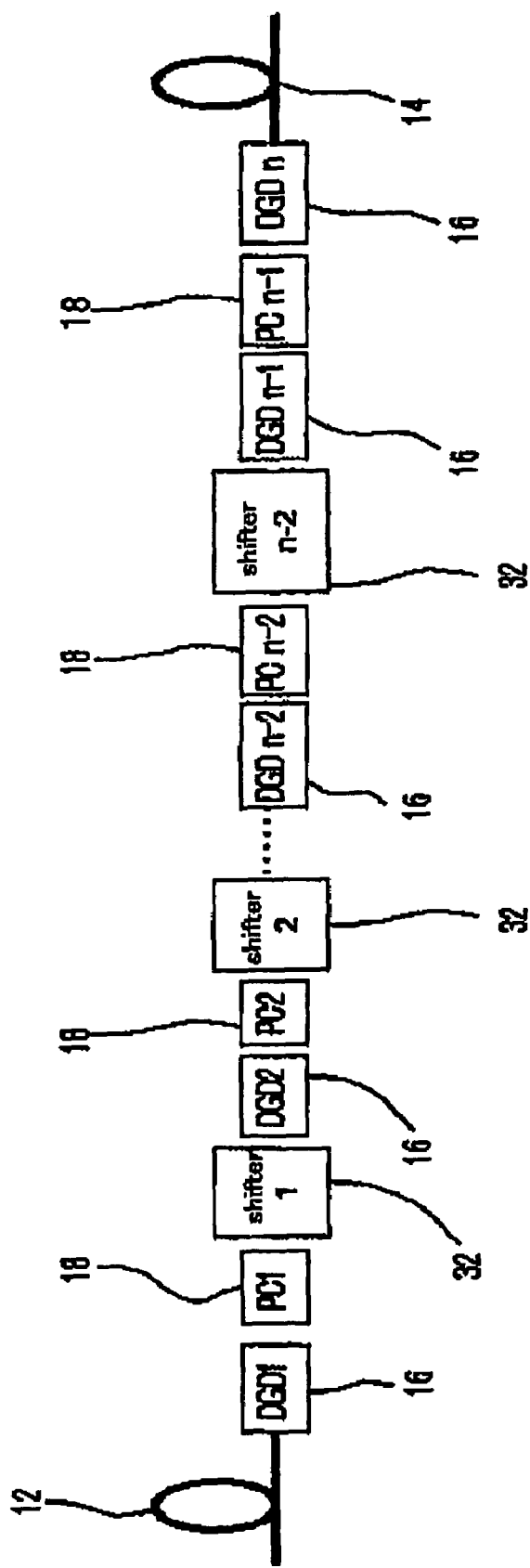
FIG. 7 is a view illustrating another configuration of the PMD emulator on FIG. 6.

FIG. 7 shows a configuration of a PMD emulator 40 which includes N DGD sections 16, (N−1) polarization controllers 18 and (N−2) shifters 32.

In FIG. 7, an input-side optical fiber 12, a first DGD section 16, a first polarization controller 18 and a first shifter 32 are arranged in this order. Arranged next to the first shifter 32 are a second DGD section 16, a second polarization controller 18 and a second shifter 32 in this order. As is not shown in FIG. 7, arranged next to the second shifter 32 are a third DGD section 16, a third polarization controller 18, a third shifter 32, a fourth DGD section, . . . , a (n−1)th DGD section 16, a (n−2)th polarization controller 18 and a (n−2)th shifter 32. Then, a (n−1)th DGD section 16 and a (n−1)th polarization controller 18 are arranged at the (n−1)th stage, and only a nth DGD section 16 is arranged at the nth stage. The nth DGD section 16 is then connected to the output-side optical fiber 14.

Figure 8:
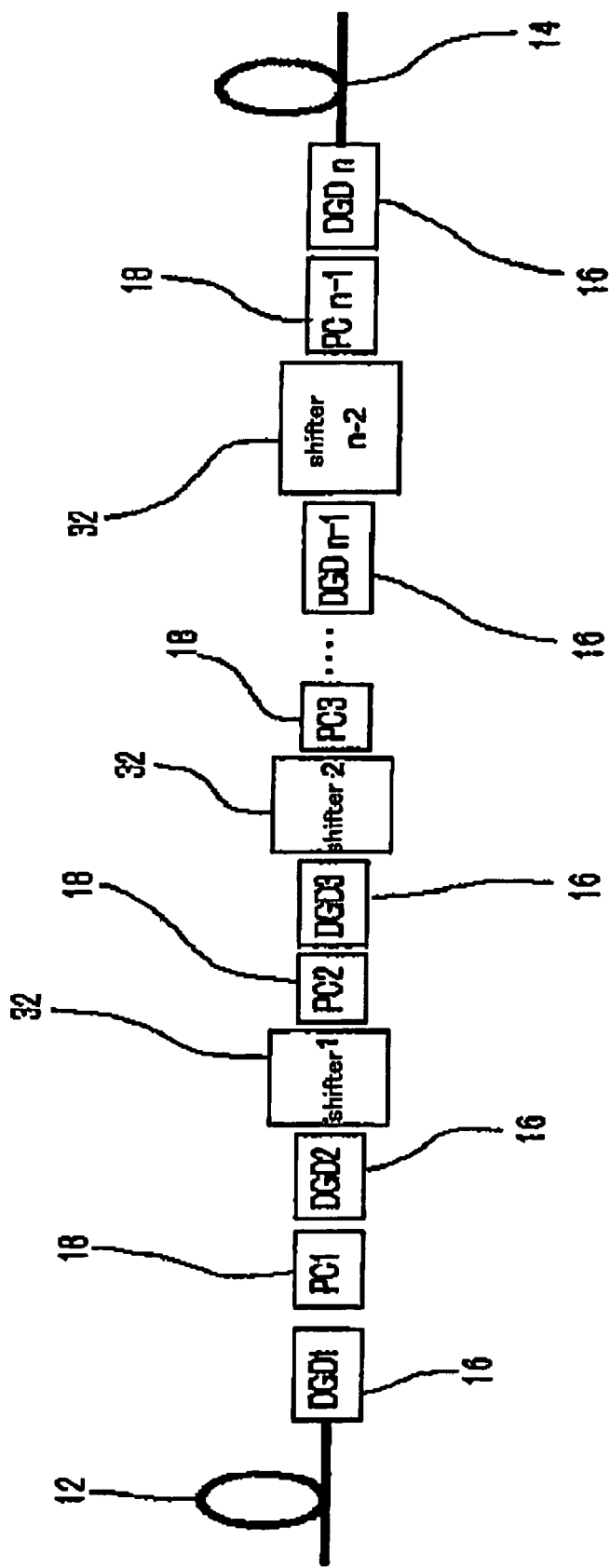
FIG. 8 is a view illustrating yet another configuration of the PMD emulator on FIG. 6.

As a modification of the embodiment on FIG. 7, a configuration of a PMD emulator 50 shown in FIG. 8 may be adopted, in which a first DGD section 16 and a first polarization controller 18 are arranged in this order, and then, a second DGD section 16, a first shifter 32 and a second polarization controller 18 are arranged in this order. These are followed by a third DGD section 16, a second shifter 32 and a third polarization controller 18 arranged in this order. DGD sections 16, shifters and polarization controllers are arranged in this way until the (n−1)th polarization controller 18, and after the (n−1)th polarization controller 18 nth DGD section 16 is arranged.

Figure 9:
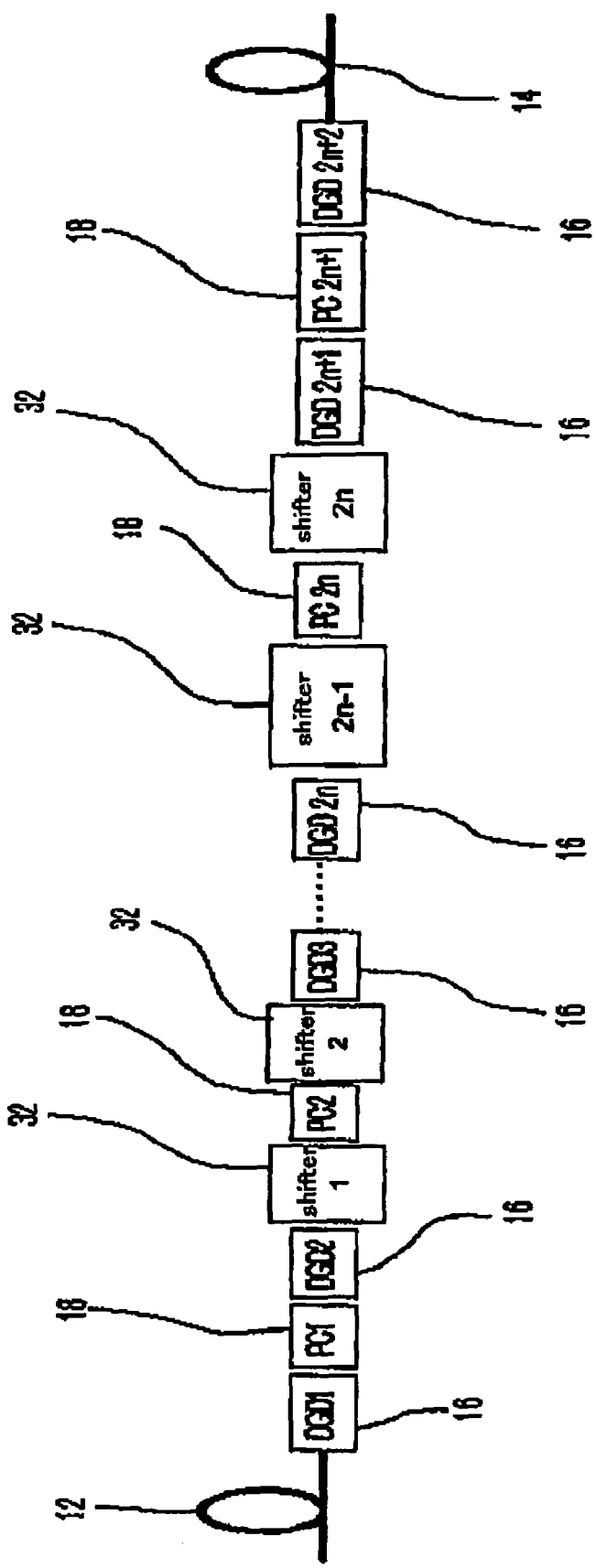
FIG. 9 is a view illustrating yet another configuration of the PMD emulator on FIG. 6.

As another modification of the embodiment on FIG. 8, a configuration of a PMD emulator 60 shown in FIG. 9 may be adopted, in which a first shifter 32 is arranged between a second polarization controller 18 and a second DGD section 16, and a second shifter 32 is arranged between the second polarization controller 18 and a third DGD section. In this case, shifters 32 are arranged to be connected one between an even-numbered polarization controller 18 and a DGD section 18 anterior to the polarization controller 18 and one between the polarization controller 18 and a DGD section 18 posterior to the polarization controller 18.

The description up to this points have been made about the configurations shown in FIGS. 7 through 9 in which (N−2) shifters 32 are arranged. Needless to say, any combination of these may be made. In other words, a DGD section other than a first DGD section 16 connected to an input-side optical fiber 12 and the nth DGD section 16 connected to an output-side optical fiber 14 is arranged with a shifter 32 for phase shifting.

Next description is made about a specific example. First, the PMD emulator shown in FIG. 5 is described specifically. Polarization controllers 18 are three Faraday rotators which function as polarization rotator. Connected to the respective polarization controllers 18 are four DGD sections 16, which is composed of PMFs.

In order to achieve a single FSR, all the PMFs of DGD sections 16 have the same length. All DGD sections have the same DGD value of 7.5 ps. The resulting FSR is 133.3 GHz, and all phases f all DGD sections are turned to it. In order to shift the DGD and SOPMD spectra in frequency while keeping the spectral profile constant, a common frequency shift has to be applied to all DGD sections 16. This phase shift can be achieved by a phase shifter 32 (see FIGS. 6 through 9) or by temperature control of the DGD sections (as is not shown temperature control is realized by a peltier, a heater or the like).

Although the number of DGD sections 16 is four, that number can be reduced by setting VFR angles to zero. For example, setting any two angles to zero reduces the number of DGD sections to two.

Because there is a natural correlation among DGD, PCD (Polarization Chromatic Dispersion), PSD (Polarization-state Dispersion) and SOPMD, these variables cannot be individually set to any arbitrary value. However, by the simulations non-linear fitting of more than one target profile, the rotational connection angles can be calculated. In the PMD emulator shown in FIGS. 5 through 9, the rotational connection angles of the polarization controllers (VFRs) can be set to the angles determined by fitting, and the error of the rotational connection angle with respect to the calculated value is less than ±3 degree.

Figure 10:
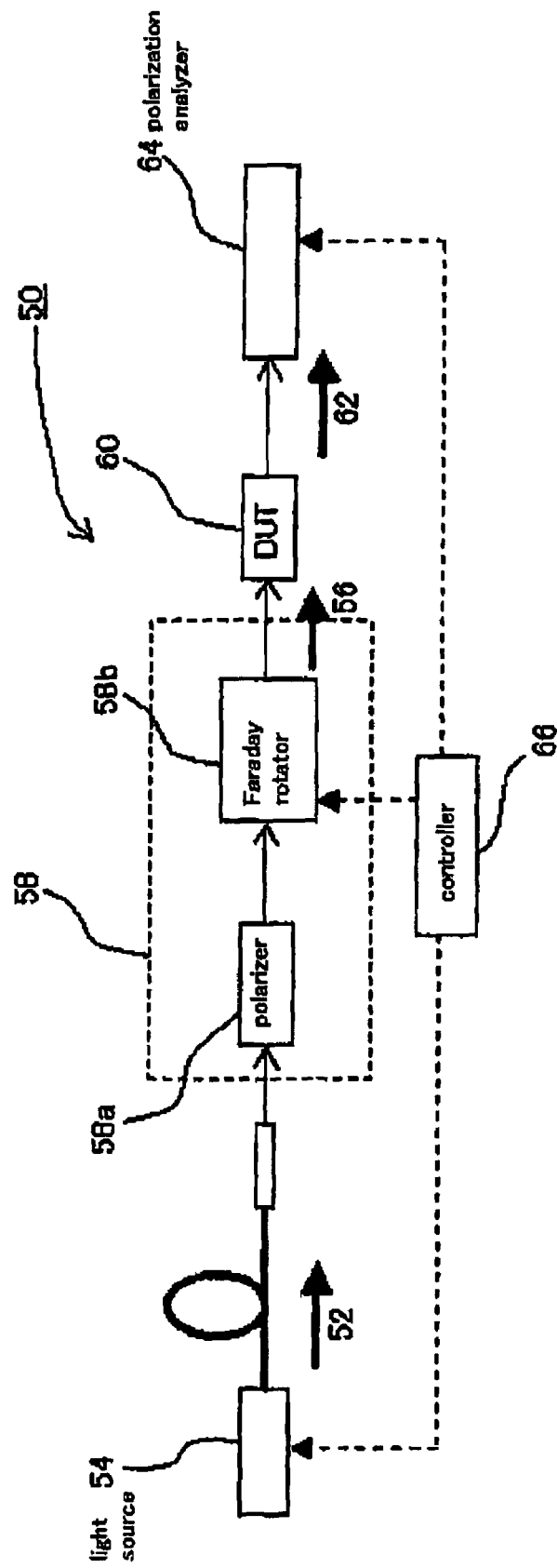
FIG. 10 is a view illustrating a configuration of a PMD measuring unit.

Next, a configuration of a PMD measuring unit 50 with use of the PMD emulator is shown in FIG. 10. This PMD measuring unit 50 is based on the general polarization analysis method, and a polarizer 581 and a Faraday rotator 58b which functions as a polarization rotator are used as a polarization controller 58.

A PMD vector is analyzed by the Muller matrix method (MMM), and is determined by measuring the two output Stokes vectors resulting from two orthogonal input Stokes vectors. Two Stokes vector measurements performed at different wavelengths are required to determine the PMD vector at one wavelength. Determining SOPMD requires Stokes vector measurement at one more wavelength. Determining SOPMD requires the measurement of at least two Stokes responses at three wavelengths. For accurate determination, these measurements have to be completed before the PMD, the SOPMD and the polarization states of the DUT change.

Utilizing a polarization controller (Faraday rotator) that has a short response time for input SOP control, measurement time can be shortened and precise measurement of PMD vector becomes possible. As a result of this, precise measurement of the two components of SOPMD can be performed. The response time of the Faraday rotator for a π/2 rotation is less than 0.2 ms.

Then, repeatability of data of a PMS emulator is described. With a fixed DGD spectrum which has frequency dependency, the SOPMD spectrum was changed by different values. The target DGD value was 20 ps at 1548 nm and the target SOPMD values were 75, 100 and 125 ps² for the whole frequency range. For each of the cases, a set of angles for the Faraday rotators was calculated by simultaneous non-linear fitting:

| SOPMD | 75 ps²: | 31.0, 67.5, 31.0 [deg.] |
|---|---|---|
| SOPMD | 100 ps²: | 26.4, 65.2, 26.4 [deg.] |
| SOPMD | 125 ps²: | 21.8, 63.5, 21.8 [deg.] |

Figure 11:
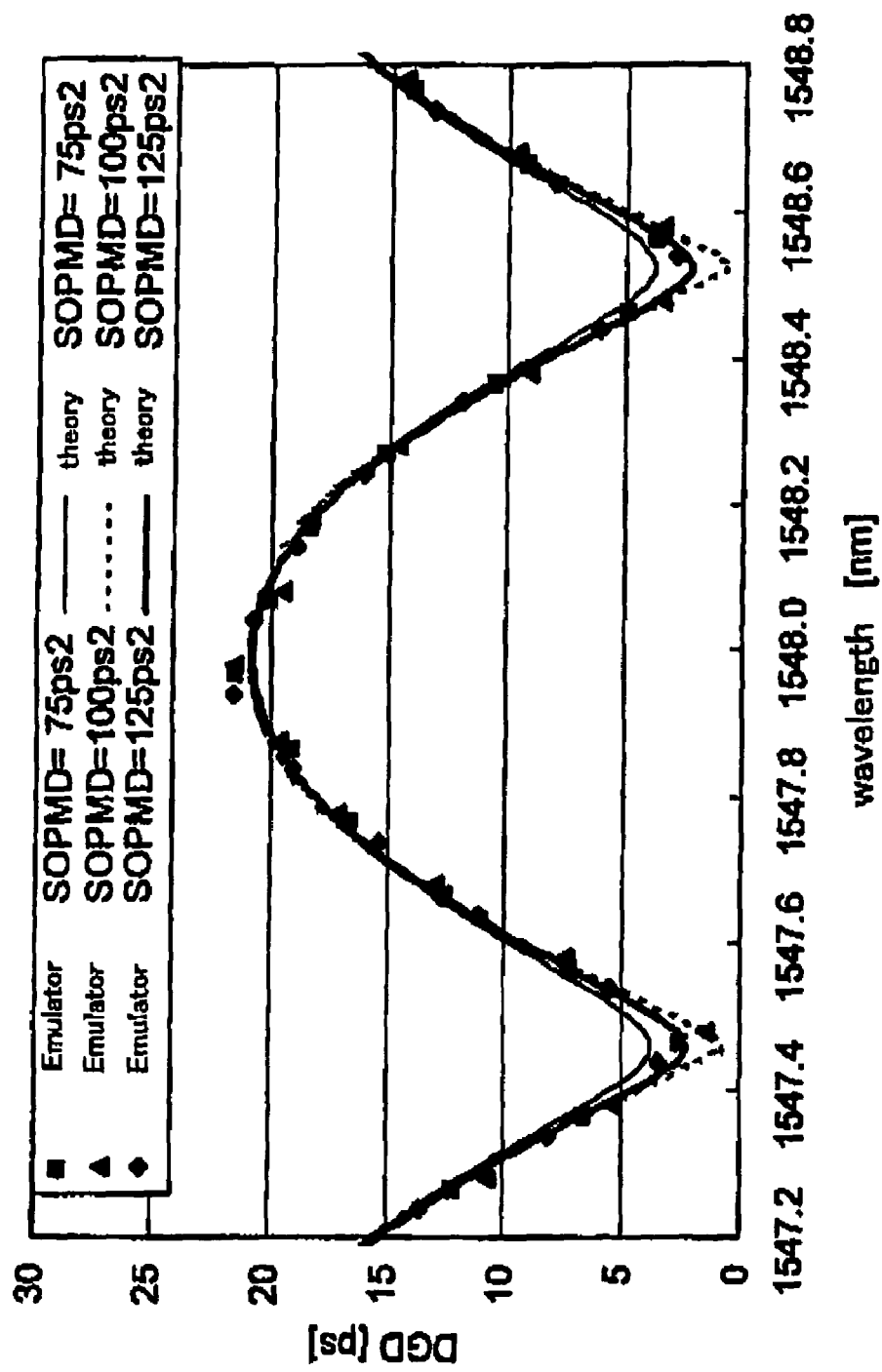
FIG. 11 is a graph of DGD values for comparing PMD characteristics of a PMD emulator and calculated values in theory.
Figure 12:
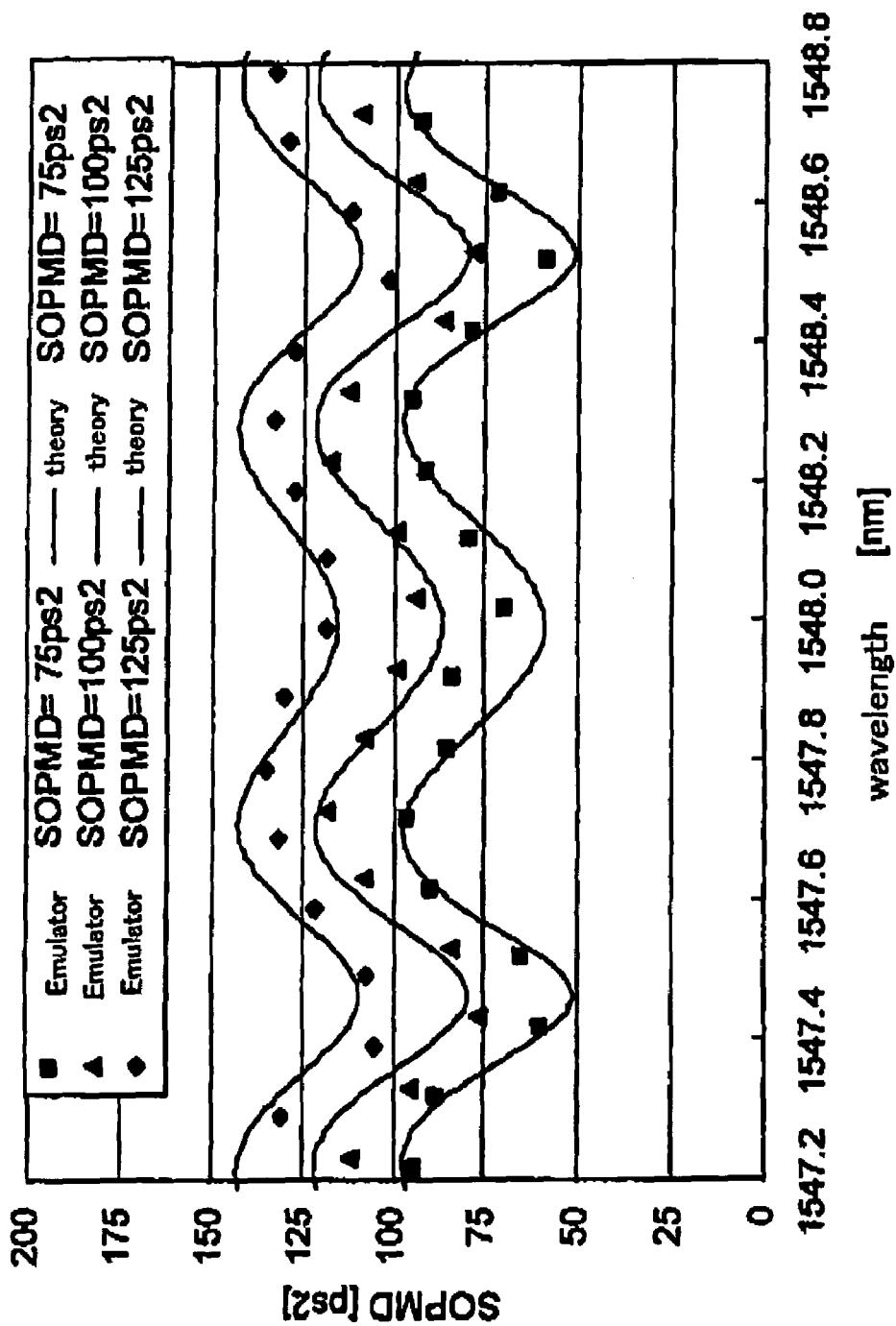
FIG. 12 is a graph of SOPMD values for comparing PMD characteristics of a PMD emulator and calculated values in theory.

FIGS. 11 and 12 show DGD and SOPMD characteristics by PMD emulator and theoretical calculated values, FIG. 11 shows DGD and FIG. 12 shows SOPMD. The data generated by PMD emulator proved to be repeatable and the sets of values are consistent.

Figure 13:
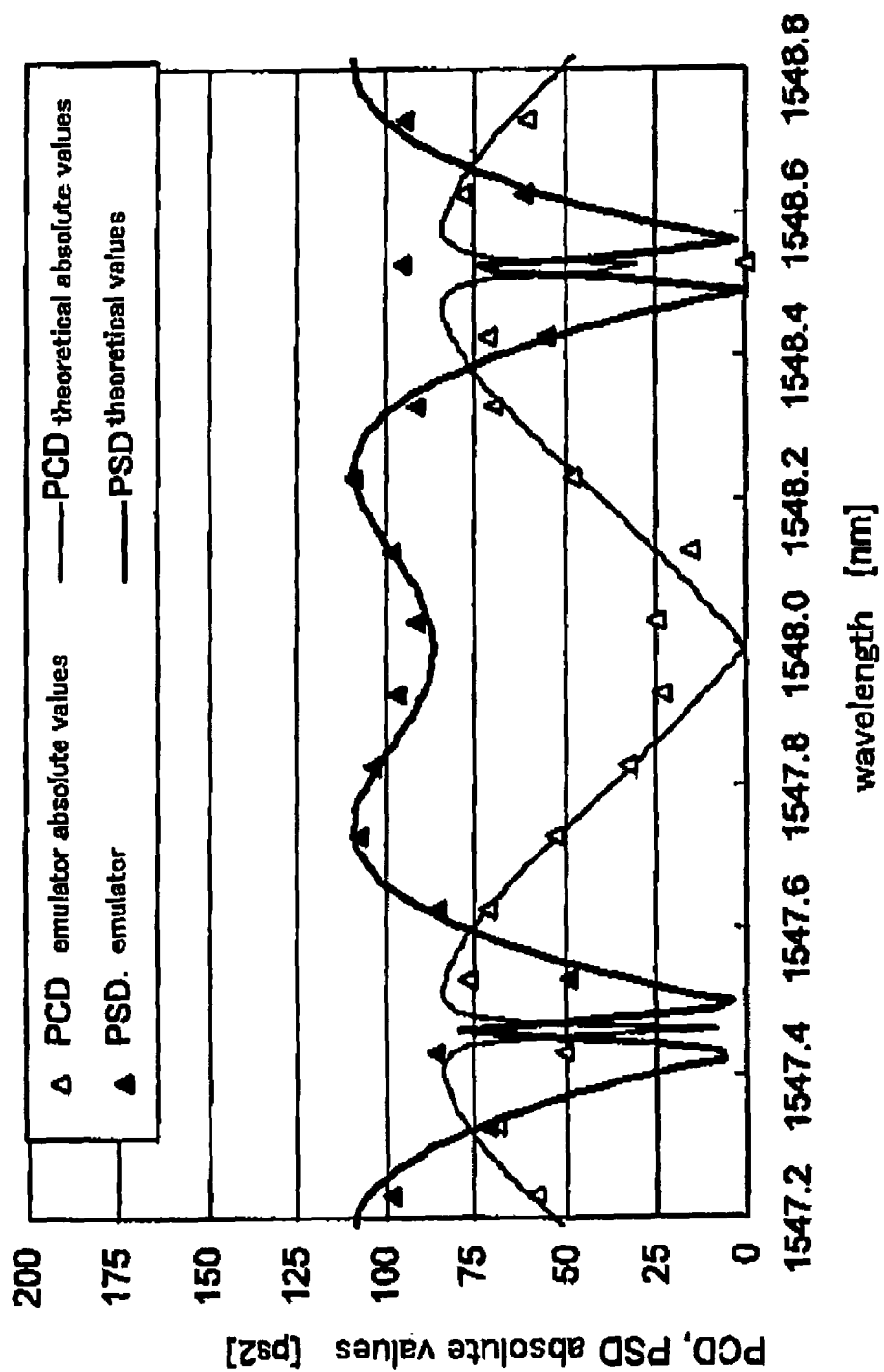
FIG. 13 is a graph of PCD absolute values and PSD divided from SOPMD values for comparing PMD characteristics of a PMD emulator and calculated values in theory.

FIG. 13 shows the absolute values of PCD and PSD separated from SOPMD when the target SOPMD was set to 100 ps², demonstrating good agreement between the measured and theoretical values. Because PCD is zero at the center frequency, SOPMD includes only the PSD component at that frequency. The ratio of PCD to PSD increases as the frequency deviates from the center frequency and the PSD component is shown again at the half cycle.

The two-section configuration of the emulator can generate flat PMD spectrum in frequency. Then, target SOPMD can be set to 75, 100 and 125 ps2. This PMD emulator can generate more than 2 kinds of PMD with SOPMD fixed. With use of this PMD emulator, it is possible to estimate degradation in performance by two components of SOPMD in an optical communication system.

As described above, a programmable PMD emulator which uses a polarization controller (Faraday rotator) and a PMD measuring unit enable accurate calculation. Here, this PMD emulatoris stable and DGD and two components of SOPMD obtained by measuring by the PMD measuring unit PMD generated by the PMD emulator are in good agreement with theoretical calculation values.

Next description is made about an embodiment of a PMD emulator which carries out emulation by fixing connection angle of DGD section and phase shifting by temperature control.

The following explanation is made with use of an actual channel model including plural mode connecting portions.

(Equation 5)

$$\ldots \begin{bmatrix} \cos\theta_3 & -\sin\theta_3 \\ \sin\theta_3 & \cos\theta_3 \end{bmatrix} \begin{bmatrix} e^{-i\tau_3\omega/2} & 0 \\ 0 & e^{i\tau_3\omega/2} \end{bmatrix} \begin{bmatrix} \cos\theta_2 & -\sin\theta_2 \\ \sin\theta_2 & \cos\theta_2 \end{bmatrix} \times$$
$$\begin{bmatrix} e^{-i\tau_2\omega/2} & 0 \\ 0 & e^{i\tau_2\omega/2} \end{bmatrix} \begin{bmatrix} \cos\theta_1 & -\sin\theta_1 \\ \sin\theta_1 & \cos\theta_1 \end{bmatrix} \begin{bmatrix} e^{-i\tau_1\omega/2} & 0 \\ 0 & e^{i\tau_1\omega/2} \end{bmatrix}$$

(5)

where a Jones matrix representing a linear shifter and a Jones matrix representing rotation are applied by turns.

Here, when a PMF or a birefringent crystal is used, Ti fluctuates depending on the ambient temperature at the optical periodic oscillation level. Assuming that fluctuation at the optical periodic oscillation level at the ambient temperature t is δTi(t) separated from Ti, index portions in the equation 5 can be expressed as follows:

(Equation 6)

$$\pm i\tau_i\omega/2 = \pm i(\tau_i\omega + \delta\tau_i(t)\omega)/2 = \pm i(\phi_i(\omega) + \delta\phi_i(\omega,t))/2 \quad (6)$$

where Φi(ω) denotes the phase of a component in defiance of fluctuation of DGD sections and depends on a frequency, while Φi(ω, t) denotes the phase of a component which fluctuates depending on the ambient temperature and depends on a frequency and the ambient temperature.

Accordingly, variable parameters in this model are a rotation angle θi and a phase Φi(ω,t) by fluctuation. Now that the PMD temporal distribution is only concerned, assuming that ω is a fixed number, they are replaced with θi(t) and δΦi(t).

FIGS. 2A through 2c show calculation results of DGD (first-order PMD) distribution obtained when in the above model, the number of stages of DGD sections is changed and θi(t) is only a random number, ((t) is fixed to be a random number), (t) is only a random number (δΦi(t) is fixed to be a random number) and both are set to random numbers. Here, in each calculation, a value of DGD section is determined so as to have an average DGD of 30 ps. Further, in order to eliminate periodicity in the frequency direction, normal distribution of each DGD section is given so that standard deviation can be 20% of the average. "Total DGD" is a sum of DGD values of used DGD sections and "average DGD" denotes an average value of used DGD sections.

Figure 14:
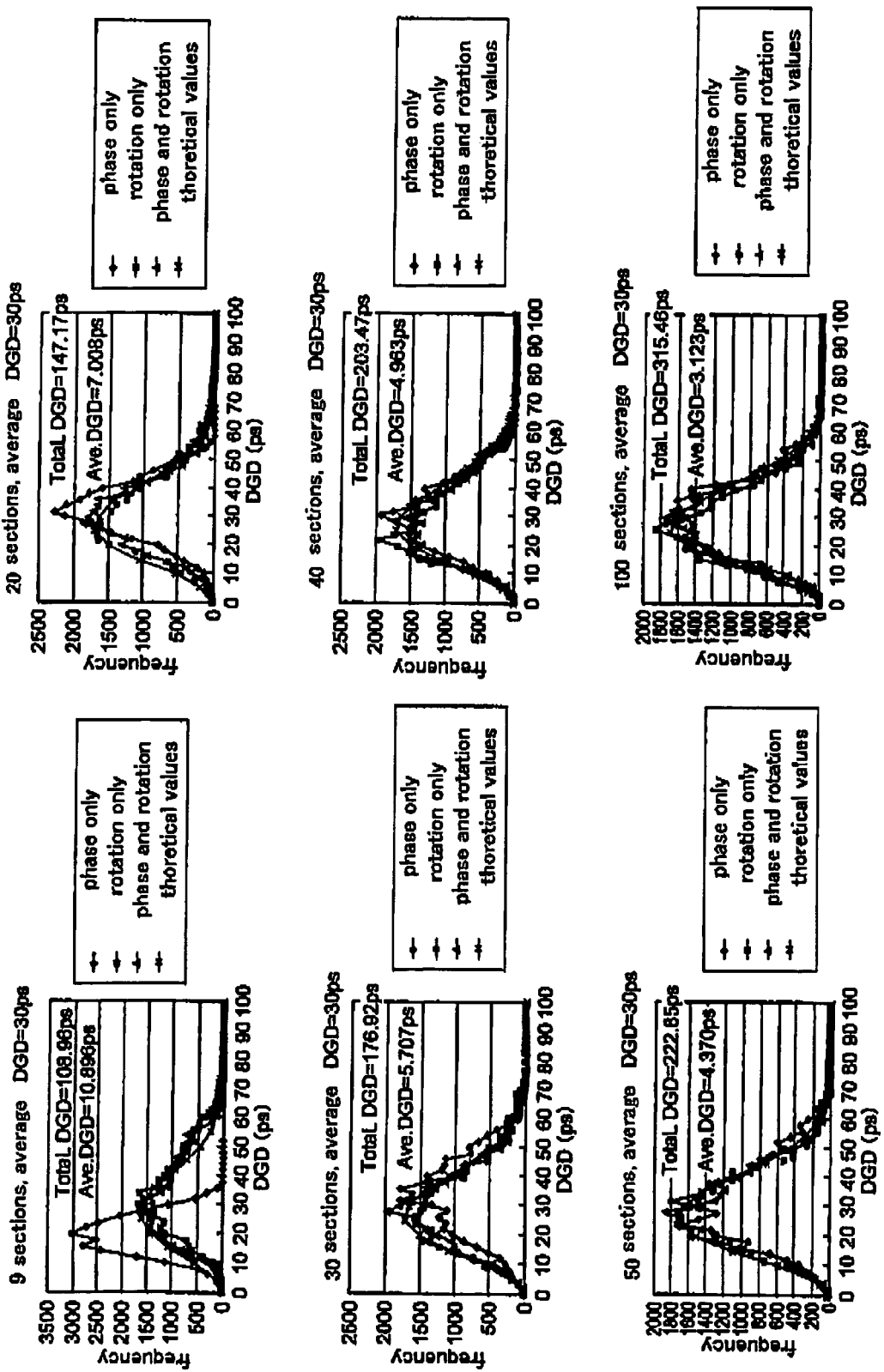
FIG. 14 shows calculation results of DGD distribution.

As is seen from FIG. 14, the resultant distribution is close to theoretical values even in 9 sections and in both cases of when rotation θi(t) is only given a number and when both are given any numbers. However, when only a phase δΦi(t) is given a number the resultant distribution does not become close to the theoretical values. In other words, when rotation is changed randomly, less sections are only required to achieve distribution close to theoretical values as compared with the case the phase is changed. However, when a mechanism for changing rotation is actually set up, the configuration will become complicated even in the 9 sections. On the other hand, when the phase is changed randomly, if DGDs of the respective DGD sections are different, the respective phase change rates for a temperature become different. Accordingly, if all the DGD sections are subjected to temperature fluctuation at once, respective phases of the DGD sections can be given random values without the need to make the DGD sections subject to temperature fluctuation one after another.

Figure 15:
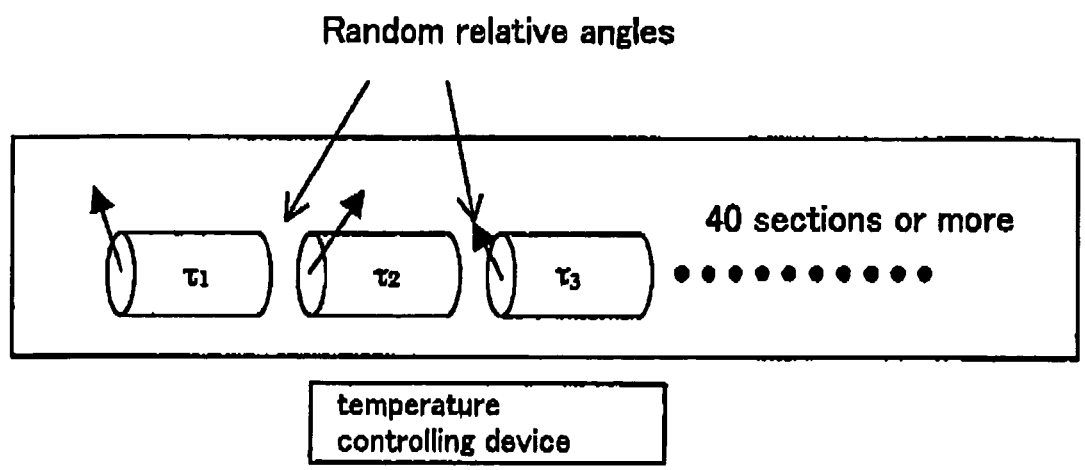
FIG. 15 is a view illustrating a PMD emulator configured by connecting 40 or more DGD sections with relative angles determined in a random fashion.

As is described up to now, if 40 or more DGD sections shown in FIG. 15 and for example a PMF are connected with relative angles set randomly to make temperature of the whole device vary, it is possible to compose a simple PMD emulator with a single controlling mechanism.

Figure 16:
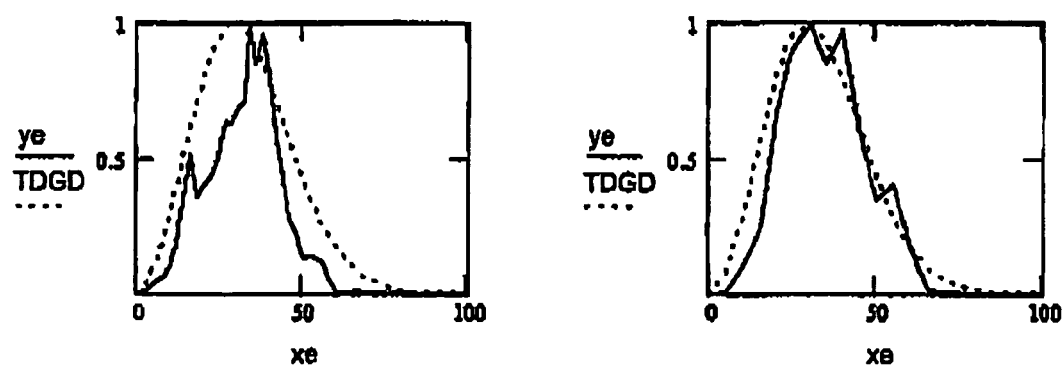
FIG. 16 shows calculation results of DGD distribution in a PMD emulator shown on FIG. 15.
Figure 17:
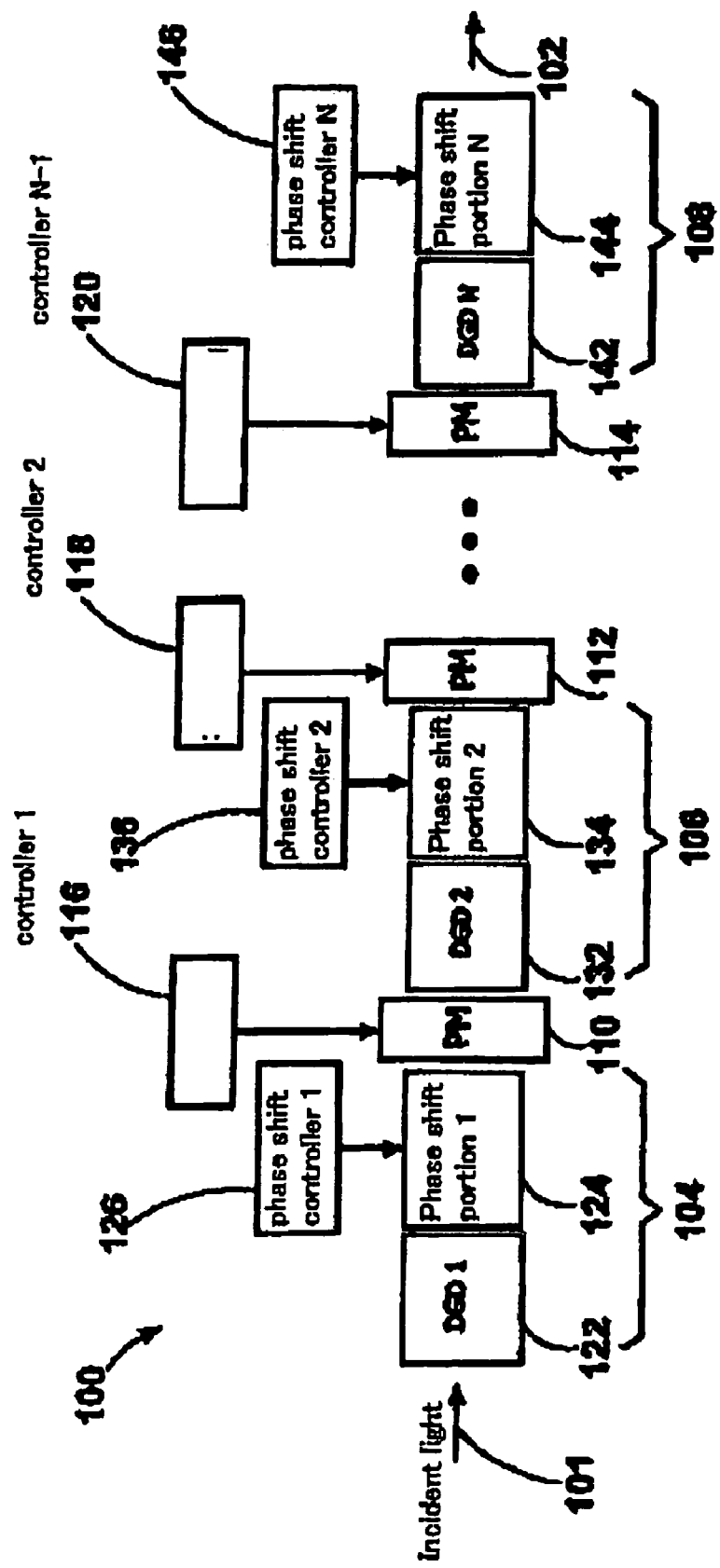
FIG. 17 is a view illustrating a configuration of a conventional PMD emulator.
Figure 18:
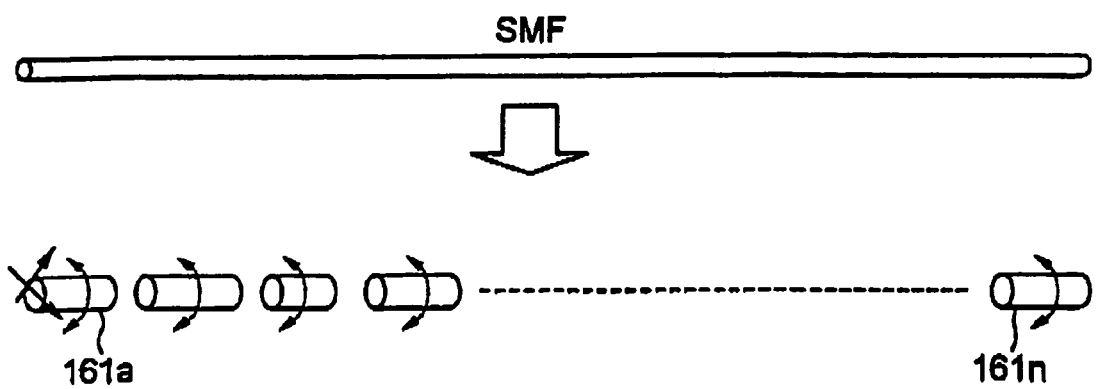
FIG. 18 is a view illustrating a configuration of a conventional PMD emulator.
Figure 19:
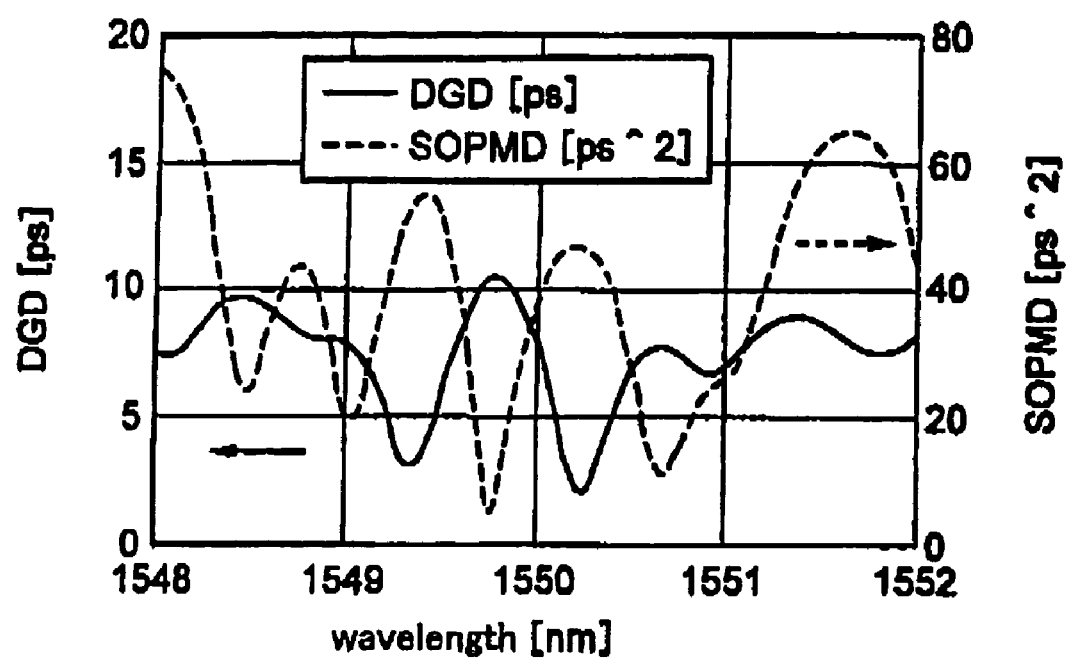
FIG. 19 is a graph showing DGD and SOPMD characteristics of a SMF.
Figure 20A:
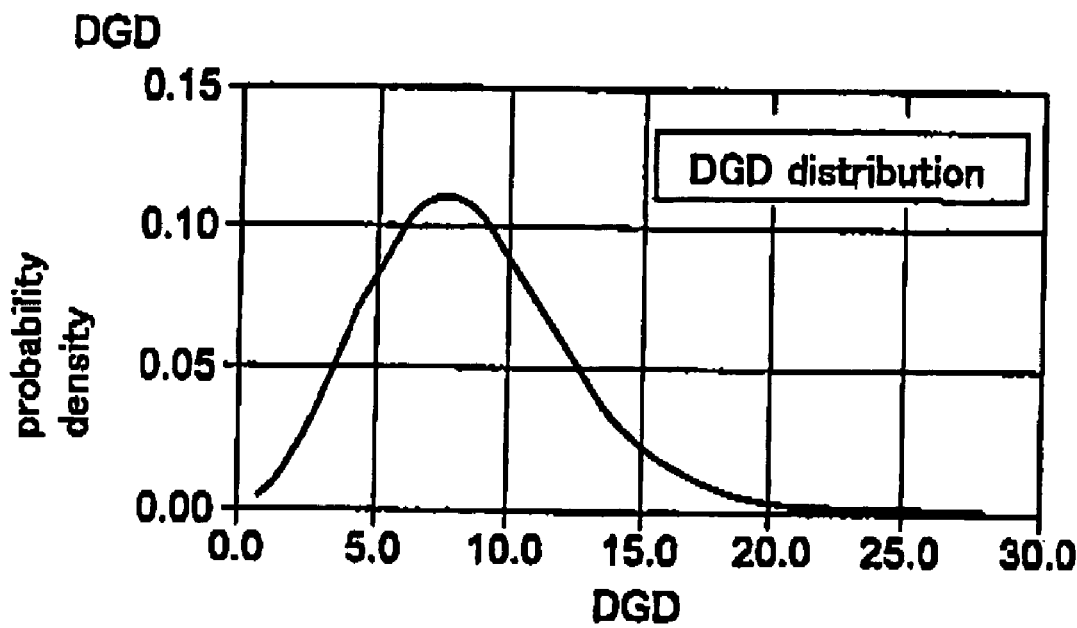
FIG. 20A is a graph of DGD distribution.
Figure 20B:
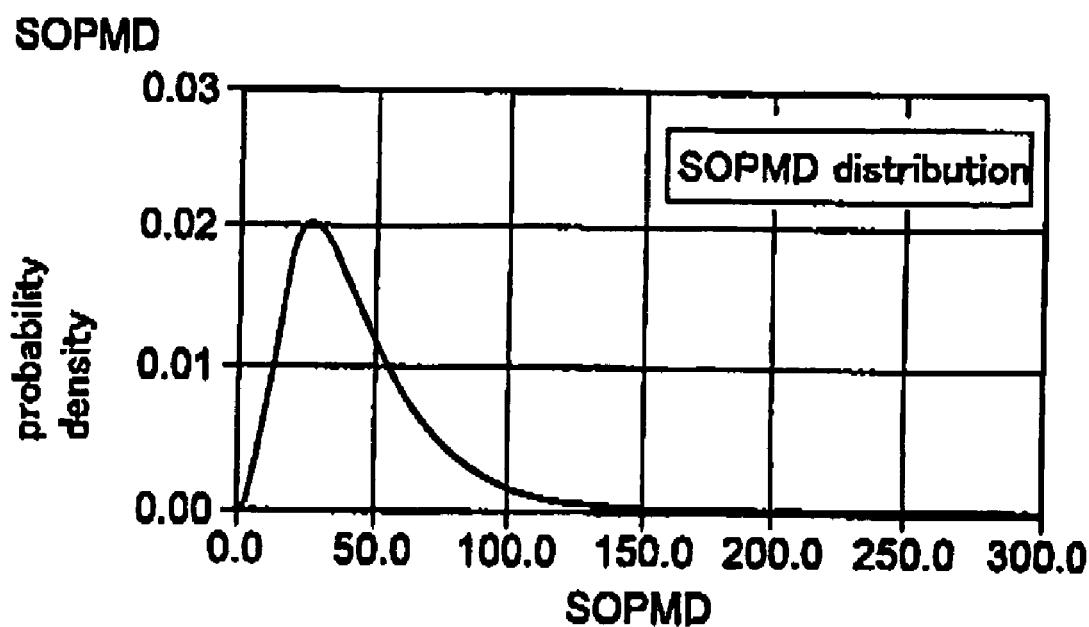
FIG. 20B is a graph of SOPMD distribution.
Figure 21:
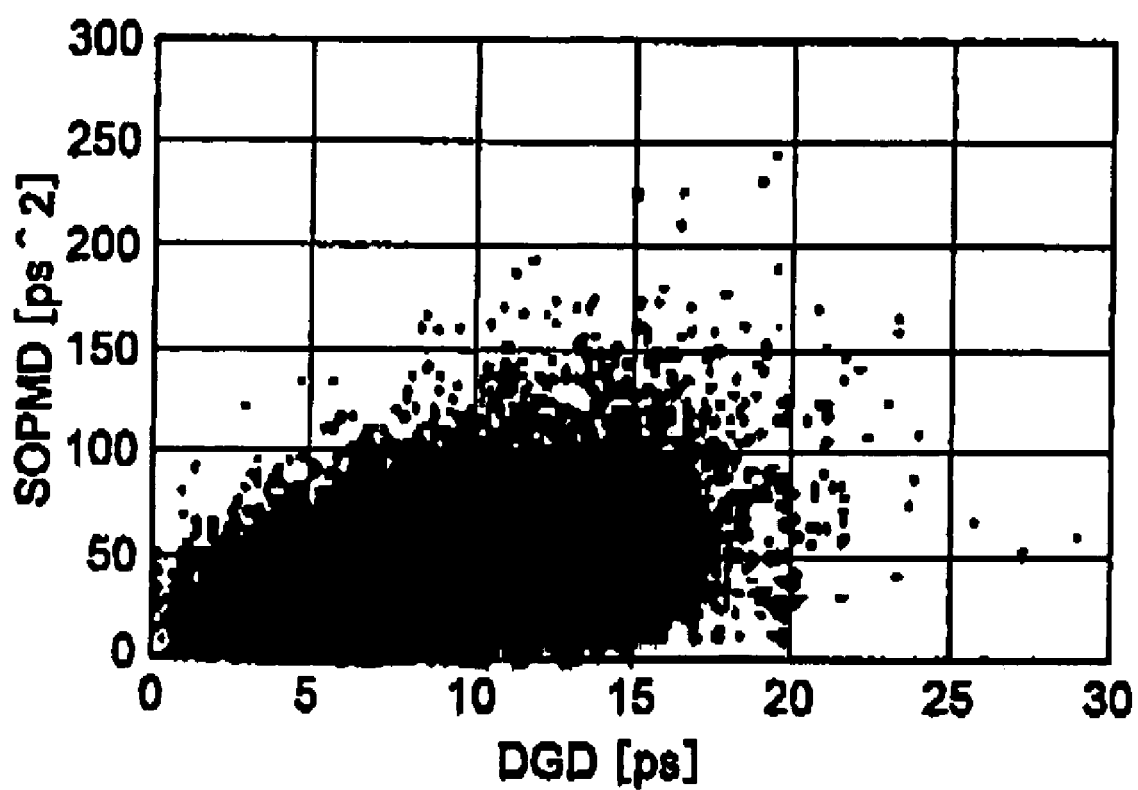
FIG. 21 is a graph showing a relationship between DGD and SOPMD.
Figure 22:
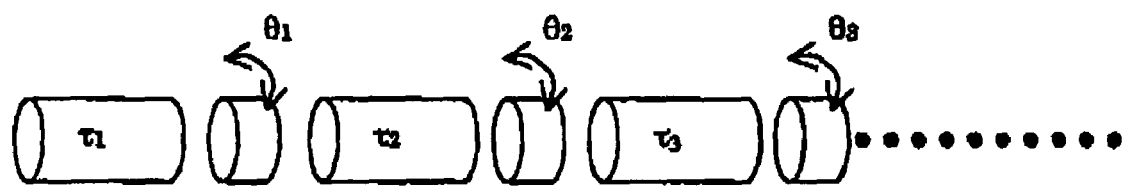
FIG. 22 is a view illustrating a configuration of a conventional PMD emulator.

FIG. 16 shows DGD distributions of a PMD emulator with a function of temperature control designed and tested so as to generate average DGD of 30 ps for 50 sections, one graph for the case when the PMD emulator is placed at a room temperature (without temperature variation) and the other for the case when the temperature is changed by a temperature controlling mechanism. When comparison is made between with and without temperature variation, it becomes clear that temperature variation causes random distribution of phases, resulting in obtaining DGD distribution close to theoretical values as shown by the above calculation.

(Other Embodiments)

As another embodiment of the present invention, an LN waveguide polarization controller is described bellow.

In this embodiment, a LiNbO3 crystal (hereinafter referred to as "LN") with an electro-optical effect is used as a substrate material, and Ti is deposited on the LN substrate and thermally diffused to form an optical waveguide. In this forming, light is propagated in the direction of C axis (same as z axis) which is an optical axis of the LN crystal.

Figure 23:
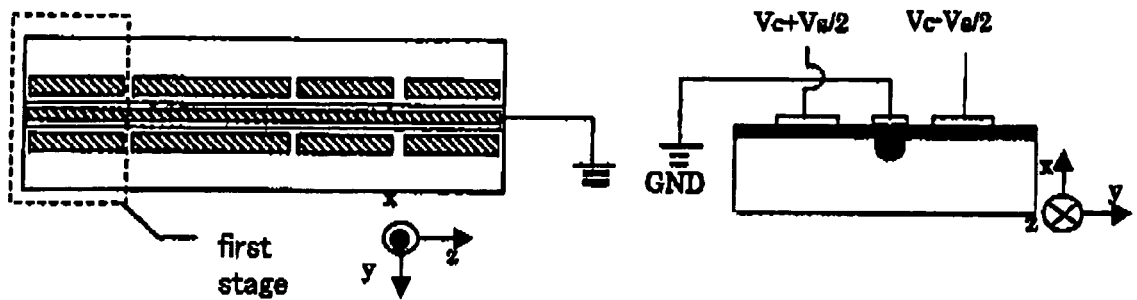
FIG. 23 is a schematic view of a LN waveguide polarization controller according to the present invention.

A configuration and a cross section of a device are shown in FIG. 23. An LN crystal which makes up the device is cut in the x axis direction and a waveguide and electrodes for control are formed on the +x face.

Electrodes for control arranged include a center electrode arranged directly on the waveguide, an upper electrode arranged apart from the waveguide and a lower electrode arranged apart from the waveguide and in the opposite direction to the upper electrode.

This center electrode and upper and lower electrodes constitute one stage. Here, one stage functions as a waveplate (see supplemental A). The whole polarization controller includes three stages of waveplates or four stages of waveplates. Waveplate characteristics of first, second, third and fourth stages are expressed by $\lambda/4$, $\lambda/2$, $\lambda/4$ and $\lambda/a$ (value of the last stage is unknown). In addition, when the waveplate characteristics are expressed in terms of a phase difference, they are $\pi/2$ rad, $\pi$ rad, $\pi/2$ rad and b rad.

In order to make each stage function as a waveplate, the center electrode is set to GND and the electrodes at the both sides thereof are applied voltages shown in FIG. 23. Vc and Vs can be expressed with use of a phase difference $\Delta\Phi$ and angle $\theta$ as follows:

$$Vs = (\Delta\Phi/\pi) V\pi \cos(2\theta) + Vb$$

$$Vc = (\Delta\Phi/\pi) V0 \sin(2\theta)$$

(see supplementals B and C) (where V0, V$\pi$ and Vb are constant numbers)

This LN waveguide polarization controller presents two ways of use, that is, as a mode converter and as a waveplate.

First, the LN waveguide polarization controller used as a mode converter is described.

When light propagates in the LN crystal along the optical axis, a refractive index depending on a medium is no in either direction. Since the waveguide is formed by diffusion of Ti here, the refractive index is apparently changed due to waveguide configuration, and the equivalent refractive index becomes different between in the TE mode and in TM mode.

Figure 24:
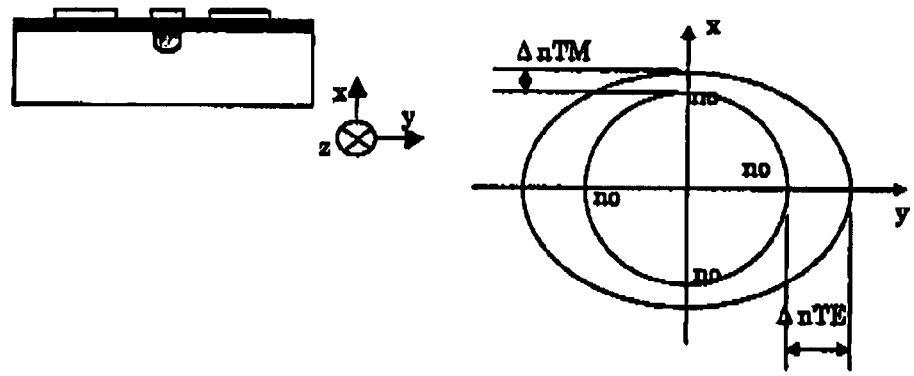
FIG. 24 is a schematic diagram showing a state of refractive index when an LN waveguide polarization controller is used as a mode converter.

When the refractive index state is shown by ellipse as in FIG. 24, incident light is divided into a long-axis component and a short-axis component of the ellipse (FIG. 24 shows the state where no voltage is applied and TE and TM modes are given), a phase difference $\Delta\Phi$ is in proportion to a product of a difference between the two equivalent refractive indexes ($\Delta nTE - \Delta nTM$) and a propagation distance (depth d).

$$\Delta\Phi \propto |\Delta nTE - \Delta nTM| \cdot d$$

Accordingly, since the propagation distance d depends on the length of an electrode, when the phase difference is fixed like waveplates, the difference of the two refractive indexes is controlled to be fixed.

Description below is about a way of applying voltages to upper and lower electrodes and state changes when the voltages are applied. There are two ways of applying voltages for control.

Figure 25:
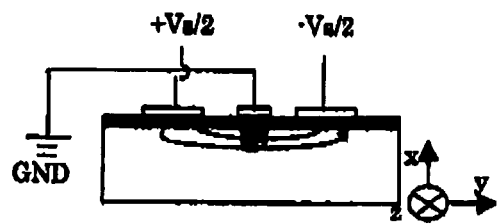
FIG. 25 is a view for explaining a way of applying to upper and lower electrodes voltages of the same magnitude but different signs.

(1) Way of applying asymmetric voltages of the same magnitude and opposite signs (see FIG. 25).

Figure 26:
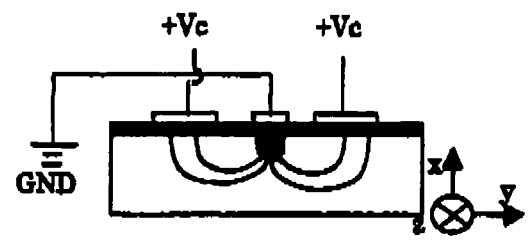
FIG. 26 is a view for explaining a way of applying to upper and lower electrodes voltages of the same magnitude and sign.

(2) Way of applying voltages of the same magnitude and the same sign (see FIG. 26).

Figure 27:
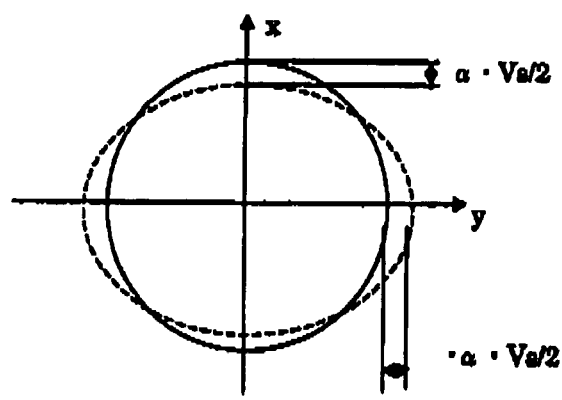
FIG. 27 is a view showing an electrolytic component applied effectively on a wave6guide, and an original state and a changed state of refractive indexes.

When voltages are applied in the way of (1), the direction of electric field effectively applied on the waveguide is y direction. In FIG. 27, the original state is indicated by a broken line and the changed state is indicated by a continuous line.

(the refractive indexes are changed by the same magnitude but different signs between x axis and y axis and a changed amount of the refractive index is in proportion to the magnitude of voltage.

In this way, when an appropriate voltage is applied in the way of (1), the refractive indexes are apparently changed, for example, due to forming of waveguide and the ellipse-shaped refractive index state can be corrected to a round one.

Besides, if an amount of voltage to be applied is controlled, the refractive index for a light component in the x axis direction and the refractive index for a light component in the y axis direction can be differentiated. In this state, since there occurs a phase difference between an x-direction component and a y-direction component of light output from the waveguide, the refractive indexes can be controlled by changing the amount of applied voltage.

Figure 28:
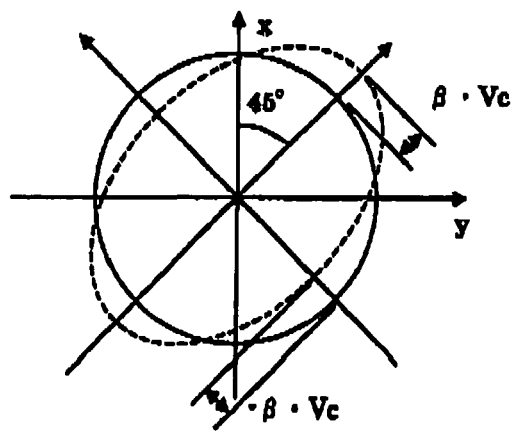
FIG. 28 is a view showing an effect of the way of applying voltages of the same magnitude and sign to upper and lower electrodes.

An effect given when voltages are applied in the way of (2) is shown in FIG. 28. The electric voltage effectively applied to the waveguide is in x direction.

However, in this case, the voltages are applied in the way of (1) at the initial state, the elliptic state of refractive indexes are returned to a round one as a waveguide is formed.

In this state, the long-axis direction and short-axis direction of the ellipse are arranged to be inclined by 45 degree with respect to the original coordinate system and a changed amount of the refractive index is in proportion to the voltage Vc to be applied.

In this state, when a difference of change of the ellipse due to voltage applied becomes fixed (when a phase difference between the long-axis direction component and the short-axis direction component of the ellipse due to applying of voltage becomes $\pi$ rad), light input in the TE mode (y-axis direction) is completely converted into light in the TM mode (x-axis direction).

In addition, light input in the TM mode is converted into light in the TE mode. When the phase difference is not $\pi$ rad but another value, a portion of light input in the TE(TM) mode is converted into light in the TM mode. Thus, a light amount of TE–TM conversion can be controlled by an amount of applied voltage thereby serving as a mode converter.

(In the cited patent, such a principle is used to serve as a TE–TM mode converter although a way of applying a voltage is different.)

Requirements for operation as a mode converter are summarized below.

(1) As an electric field component in the y direction, an amount of voltage for allowing elliptic refractive index state caused by forming a waveguide to be returned to round one is applied.

(2) As an electric field in the x direction an amount of voltage is controlled depending on desired degree of mode conversion.

If it is assumed that a voltage for generating an electric field in the y direction is Vs and a voltage for generating an electric field in the x direction is Vc, the following relations can be given:

Vs=Vb (Vb: constant number (voltage for allowing an elliptic refractive index state caused by forming a waveguide to be returned to a round one))

Vc=Vc (value depends on desired degree of mode conversion)

Next description is made about an LN waveguide polarization controller used as a waveplate.

Figure 29:
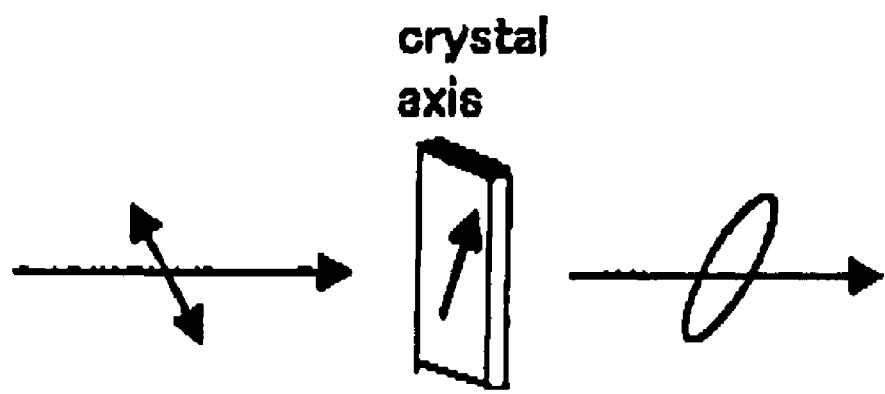
FIG. 29 is a view showing a principle when an LN waveguide polarization controller is used as a waveplate.

In general, a waveplate has two refractive indexes based on states of polarization of light in the light propagating direction. The waveplate is an optical element which, when light is input to the waveplate, can add a fixed phase difference between the two states of polarization inherent to the waveplate (which is used for converting a state of polarization into another state of polarization, and which is most commonly implemented by a plate-type-manufactured quartz (LN is possible) (see FIG. 29)).

In addition, since conversion of any input state of polarization into another state of polarization can be realized by rotating and connecting a waveplate, if a waveplate which allows rotation with respect to plural (C axis) rotation angles is used, it is possible to achieve a polarization controller which enables any polarization state conversion.

Figure 30:
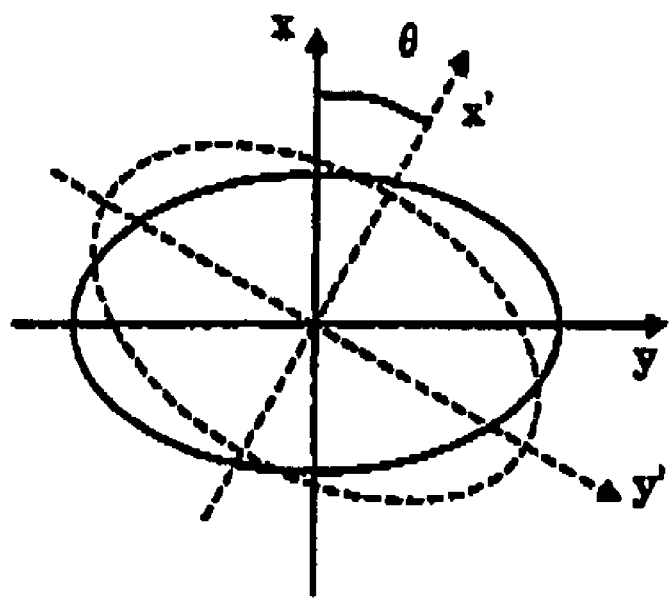
FIG. 30 is a view showing a state of refractive indexes when a waveplate is under operation.

When the LN waveguide polarization controller serves as a waveplate, this can be also realized by an electric field component in the x direction and an electric field component in the y direction. However, when the polarization controller functions as a waveplate, it is required to set a fixed phase difference between the two axes and a rotation angle which are parameters indicative of characteristics of the waveplate (see FIG. 30), and therefore, an amount of applied voltage is different from that for a mode converter.

According to a mode converter, as an electric field component in the y axis direction, it is necessary to apply an amount of voltage that allows to correct a refractive index difference between TE–TM modes and change an elliptic state into a round one. On this other hand, in order to be used as a waveplate, it is necessary to adjust an electric field component in the y direction together with an electric field component in the x direction depending on obtained phase difference and rotation angle.

Conversely, in order to serve as a waveplate, an amount of voltage to be applied is required to be set to a value shifted from the applied voltage amount for allowing an elliptic refractive index state to be returned to a round one based on a rotational amount of the waveplate.

Further, if it is assumed that a voltage for generating an electric field in the y direction is Vs and a voltage for generating an electric field in the x direction is Vc, the following relations can be given:

$$Vs=(\Delta\Phi/\pi)V\pi \cos(2\theta)+Vb$$

$$Vc=(\Delta\Phi/\pi)V0 \sin(2\theta)$$

Where $\Delta\Phi$ and $\theta$ are a phase difference of a waveplate and an angle, respectively, and V0, V$\pi$ and Vb (Vb denotes voltage for allowing an elliptic refractive index state caused by forming a waveguide to be returned to a round one) are constant.

Up to this point we has described that a conventional PMD emulator needs a plurality of DGD sections, which presents problem of complex and inexpensive configuration while a PMD emulator according to the present invention can be achieved by a simple device with a much smaller number of DGD sections which however have PMD characteristics.

In addition, when a PMD emulator according to the present invention is used, it is possible to generate desired DGD and SOPMD at some time and monitor them by control based on controlling parameters obtained by simulations.

Further, in a PMD emulator according to the present invention, it is possible to make average DGD variable be controlling a polarization rotator accurately without changing PMD characteristics of each DGD section. Since the Faraday rotator is made of a garnet crystal, it is possible to reduce insertion loss as compared with YVO4, LiNbo3.

Furthermore, according to a PMD emulator of the present invention, since a Faraday rotator is arranged to function as a polarization controller, it is possible to control polarization rotation by less power consumption.

Furthermore, according to a PMD emulator of the present invention, it is possible to change a phase by temperature control with use of one controller and emulate PMD An LN waveguide polarization controller according to the present invention can be applicable to a mode converter and a waveplate.

The invention claimed is:

1. A PMD emulator comprising:
   an input-side optical fiber for receiving light to be measured;
   an output-side optical fiber for outputting the light to be measured;
   a first polarization rotating portion including M DGD sections (M is an integer equal to or more than 2) and (M−1) polarization rotators alternatively concatenated with M DGD sections, one DGD section being arranged at each end of said first polarization rotating portion;
   a second polarization rotating portion including N DGD sections (N is an integer equal to or more than 2) and (N−1) polarization rotators alternatively concatenated with N DGD sections, one DGD section being arranged at each end of said second polarization rotating portion; and
   an arbitrary-arbitrary polarization controller for changing any state of polarization into any other state of polarization;
   wherein said input-side optical fiber is connected to a DGD section at an input side of said first polarization rotating portion, a DGD section at an output side of said first polarization rotating portion being connected to a connecting portion at an input side of said arbitrary-arbitrary polarization controller, a connecting portion at an output side of said arbitrary-arbitrary polarization controller being connected to a DGD section at an input side of said second rotating portion, and a DGD section at an output side of said second polarization rotating portion being connected to said output-side optical fiber.

2. The PMD emulator as claimed in claim 1, wherein the polarization controller is configured as a polarization rotator connected to each end of a polarization shifter.

3. The PMD emulator as claimed in claim 1, wherein M is 2 and N is 2.

4. The PMD emulator as claimed in any one of claims 1 through 3, wherein said polarization rotators are controlled based on a control parameter obtained by a simulation thereby to generate a desired PMD value.

5. The PMD emulator as claimed in any one of claims 1 through 3, wherein said polarization rotators are controlled to change an average DGD without changing DGD characteristics of the DGD sections.

6. The PMD emulator as claimed in claim 1, wherein each of the first and second polarization rotating portions includes 40 or more DGD sections connected at a random relative angle to each other and a temperature controlling means for changing a temperature as a whole.

7. The PMD emulator as claimed in claim 6, wherein each DGD section has different DGD in accordance with normal distribution.

8. The PMD emulator as claimed in claim 7, wherein standard deviation of the normal distribution is 20% of an average of the normal distribution.

9. The PMD emulator as claimed in any one of claims 6 through 8, wherein the DGD sections are polarization maintaining fibers or uniaxial birefringent crystals.

* * * * *